(12) United States Patent
Ochiai

(10) Patent No.: US 11,493,248 B2
(45) Date of Patent: Nov. 8, 2022

(54) LIQUID LEVEL DETECTION DEVICE AND REFRIGERATION CYCLE APPARATUS

(71) Applicant: Mitsubishi Electric Corporation, Tokyo (JP)

(72) Inventor: Yasutaka Ochiai, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 832 days.

(21) Appl. No.: 16/318,436

(22) PCT Filed: Oct. 19, 2016

(86) PCT No.: PCT/JP2016/080900
§ 371 (c)(1),
(2) Date: Jan. 17, 2019

(87) PCT Pub. No.: WO2018/073902
PCT Pub. Date: Apr. 26, 2018

(65) Prior Publication Data
US 2019/0293329 A1 Sep. 26, 2019

(51) Int. Cl.
*F25B 43/02* (2006.01)
*G01F 23/24* (2006.01)
(Continued)

(52) U.S. Cl.
CPC .............. *F25B 43/02* (2013.01); *F25B 43/00* (2013.01); *G01F 23/00* (2013.01); *G01F 23/22* (2013.01); *G01F 23/24* (2013.01); *G01F 23/246* (2013.01); *G01F 23/26* (2013.01); *G01F 23/263* (2013.01); *G01F 23/28* (2013.01); *G01N 27/22* (2013.01)

(58) Field of Classification Search
CPC .......... F25B 43/00; F25B 43/02; G01F 23/00; G01F 23/24; G01F 23/26; G01F 23/28; G01N 27/22
See application file for complete search history.

(56) References Cited

U.S. PATENT DOCUMENTS 3,283,532 A   11/1966  Kocher
2002/0029632 A1   3/2002  Nozawa et al.
(Continued)

FOREIGN PATENT DOCUMENTS

CN   102213214 A   10/2011
CN   105486381 A   4/2016
(Continued)

OTHER PUBLICATIONS

Chinese Office Action dated Nov. 25, 2020, issued in Corresponding CN Patent Application No. 201680089479.8.
(Continued)

*Primary Examiner* — David Z Huang
*Assistant Examiner* — Jared C. Palmer
(74) *Attorney, Agent, or Firm* — Posz Law Group, PLC

(57) ABSTRACT

A liquid level detection device that is provided in a vessel and configured to detect a liquid level of fluid stored in the vessel includes a first plate formed in a plate shape, and a second plate formed in a plate shape and disposed to face the first plate. The first plate is disposed in such a manner that a surface opposite to a surface facing the second plate is orthogonal to a flow direction of fluid around the first plate in the vessel.

9 Claims, 10 Drawing Sheets

(51) Int. Cl.
  *G01F 23/26* (2022.01)
  *G01F 23/28* (2006.01)
  *F25B 43/00* (2006.01)
  *G01F 23/00* (2022.01)
  *G01F 23/22* (2006.01)
  *G01F 23/263* (2022.01)
  *G01N 27/22* (2006.01)

(56) References Cited

U.S. PATENT DOCUMENTS

| | | | |
|---|---|---|---|
| 2011/0239672 A1 | 10/2011 | Won et al. | |
| 2013/0320248 A1* | 12/2013 | Yoshida | B41J 2/17553 |
| | | | 250/577 |
| 2017/0211960 A1 | 7/2017 | Toyoshima et al. | |
| 2018/0224318 A1* | 8/2018 | Blodt | G01F 23/284 |

FOREIGN PATENT DOCUMENTS

| | | | | |
|---|---|---|---|---|
| EP | 0039510 A1 | * | 5/1981 | ............ G01F 23/22 |
| EP | 0872717 A1 | * | 3/1998 | ............ G01F 23/24 |
| GB | 2268271 A | * | 1/1994 | ............ G01F 23/22 |
| JP | S35-029040 Y | | 11/1960 | |
| JP | S59-027223 A | | 2/1984 | |
| JP | S59-117101 A | | 7/1984 | |
| JP | S60-102625 A | | 6/1985 | |
| JP | S60-119420 A | | 6/1985 | |
| JP | S61-269024 A | | 11/1986 | |
| JP | S62-167121 U | | 10/1987 | |
| JP | S63-168774 U | | 11/1988 | |
| JP | H01-179229 U | | 12/1989 | |
| JP | H04-280601 A | | 10/1992 | |
| JP | H08-122128 A | | 5/1996 | |
| JP | H09-079711 A | | 3/1997 | |
| JP | H09096618 A | | 4/1997 | |
| JP | 10103820 A | * | 4/1998 | ............ F25B 49/02 |
| JP | H10-103820 A | | 4/1998 | |
| JP | 2000179996 A | * | 6/2000 | ............ F25B 43/006 |
| JP | 2000-283825 A | | 10/2000 | |
| JP | 2006-300793 A | | 11/2006 | |
| JP | 2016-090305 A | | 5/2016 | |
| JP | 2016090300 A | | 5/2016 | |
| KR | 20150056317 A | * | 11/2013 | ............ G01F 23/263 |
| KR | 20150123586 A | * | 4/2014 | ............ F25B 43/02 |
| WO | WO-2012102701 A1 | * | 8/2012 | ............ G01F 23/263 |
| WO | WO-2015140884 A1 | * | 9/2015 | ............ C09K 5/045 |
| WO | 2016059706 A1 | | 4/2016 | |
| WO | WO-2016093169 A1 | * | 6/2016 | ............ F04B 39/02 |

OTHER PUBLICATIONS

Office Action dated Sep. 29, 2020 issued in corresponding JP patent application No. 2018-546078 (and English Translation).
Extended European Search Report dated Sep. 26, 2019 issued in corresponding EP patent application No. 16919274.7.
Office Action dated Mar. 13, 2020 issued in corresponding CN patent application No. 201680089479.8 (with English Translation).
International Search Report of the International Searching Authority dated Jan. 24, 2017 for the corresponding international application No. PCT/JP2016/080900 (and English translation).
Office Action dated Mar. 3, 2020 issued in corresponding JP patent application No. 2018-546078 (with English Translation).
Chinese Office Action dated May 6, 2021, issued in corresponding CN Patent Application No. 201680089479.8 (and English Machine Translation).
Japanese Office Action dated May 11, 2021, issued in corresponding JP Patent Application No. 2018-546078 (and English Machine Translation).

* cited by examiner (a)

LIQUID LEVEL DETECTION DEVICE AND REFRIGERATION CYCLE APPARATUS

CROSS REFERENCE TO RELATED APPLICATION

This application is a U.S. national stage application of International Application No. PCT/JP2016/080900, filed on Oct. 19, 2016, the contents of which are incorporated herein by reference.

TECHNICAL FIELD

The present invention relates to a liquid level detection device that detects a liquid level position of fluid stored in a vessel, and a refrigeration cycle apparatus provided with the liquid level detection device.

BACKGROUND

A conventional liquid storage reservoir includes a liquid level detection sensor used for detection of a height position of a liquid level of liquid stored in the liquid storage reservoir (see, for example, Patent Literature 1).

The liquid storage reservoir and a liquid level detection mechanism disclosed in Patent Literature 1 include a vessel configured to store liquid and gas, a supporter having an upper end portion connected and fixed to an upper surface portion of the vessel, a heating resistor mounted to a lower end portion of the supporter, and a voltmeter configured to measure a voltage applied across both ends of the heating resistor.

A value of a voltage measured by the voltmeter when the heating resistor is immersed through a liquid surface in the vessel and a value of a voltage measured by the voltmeter when the heating resistor is not immersed through the liquid surface and is in contact with the gas differ from each other. With the technology disclosed in Patent Literature 1, the liquid level is detected on the basis of the voltage value that differs depending on whether or not the heating resistor (heat generating element) is immersed through the liquid surface.

A liquid level detection sensor includes a capacitance sensor including electrode plates facing each other, the electrode plates being immersed into refrigerant in a liquid receptor, and a capacitance conversion unit that converts a capacitance detection value of the capacitance sensor into an oscillation frequency, the liquid level detection sensor converting the oscillation frequency of the capacitance conversion unit into a liquid level of the refrigerant to determine the liquid level (see, for example, Patent Literature 2).

A liquid level detection sensor includes an ultrasonic sensor array consisting of a plurality of ultrasonic sensors arranged in a row mounted to a side surface of a receiver or an accumulator of an air-conditioning apparatus, the liquid level detection sensor determining the presence or absence of the liquid refrigerant on the basis of the received ultrasonic signal (see, for example, Patent Literature 3).

A sensor is provided with a laser beam projecting device that projects a laser beam on a liquid surface at a given angle and an optical sensor that receives the laser beam incident on the liquid surface and refracted in the liquid, the sensor detecting whether the liquid level is in a normal liquid level range depending on whether the optical sensor has received the laser beam (see, for example, Patent Literature 4).

PATENT LITERATURE

Patent Literature 1: Japanese Unexamined Patent Application Publication No. 59-27223

Patent Literature 2: Japanese Unexamined Patent Application Publication No. 09-079711

Patent Literature 3: Japanese Unexamined Patent Application Publication No. 08-122128

Patent Literature 4: Japanese Unexamined Patent Application Publication No. 10-103820

A case is considered below in which the liquid storage reservoir is mounted in a refrigeration cycle apparatus and the above-described type of sensor is used as a unit configured to detect the liquid level of fluid stored in the liquid storage reservoir. The fluid flowing into the liquid storage reservoir mainly contains gas refrigerant, but droplet-like liquid refrigerant and refrigerating machine oil are often mixed in the fluid.

In a heating type liquid level detection sensor as disclosed in Patent Literature 1, when liquid droplets are mixed in a gaseous part in the liquid storage reservoir, heat dissipation of the heat generating element in the gaseous part is promoted, and the element temperature of the gaseous part becomes the same as or close to the temperature of the heat generating element at the time when the heat generating element is immersed into the liquid refrigerant. Thus, the gaseous part may be erroneously determined as a liquid part.

In a capacitance type liquid level detection sensor as disclosed in Patent Literature 2, the capacitance changes due to the influence of liquid droplets. Thus, the gaseous part may be erroneously determined as a liquid part.

In an ultrasonic type liquid level detection sensor as disclosed in Patent Literature 3, an ultrasonic signal (a signal may be a wave signal or a vibration signal) changes due to the influence of liquid droplets, which creates the possibility of false detection.

In an optical liquid level detection sensor as disclosed in Patent Literature 4, light is scattered due to the influence of liquid droplets, which creates the possibility of erroneous determination.

SUMMARY

The present invention has been made to solve the problems described above, and has an object to provide a liquid level detection device capable of reducing false detection, such as erroneous detection of a gaseous part as a liquid part, and improving detection accuracy of a liquid level position, and a refrigeration cycle apparatus provided with the liquid level detection device.

A liquid level detection device according to one embodiment of the present invention is a liquid level detection device that is provided in a vessel and configured to detect a liquid level of fluid stored in the vessel, the liquid level detection device including a first plate formed in a plate shape, and a second plate formed in a plate shape and disposed to face the first plate. The first plate is disposed in such a manner that a surface opposite to a surface facing the second plate is orthogonal to a flow direction of fluid around the first plate in the vessel.

A refrigeration cycle apparatus according to another embodiment of the present invention includes a refrigerant circuit having a compressor, a condenser, an expansion device, an evaporator, and an accumulator that are connected by a pipe. The above-described liquid level detection device is installed in a vessel forming a portion of the accumulator and configured to detect a liquid level position of liquid refrigerant stored in the vessel.

In the liquid level detection device according to one embodiment of the present invention, as the surface opposite to the surface of the first plate that faces the second plate is orthogonal to the flow direction of the fluid around the first plate in the vessel, the first plate also serves as a shielding portion, and thereby erroneous determination due to the influence of the liquid droplets can be reduced.

In the refrigeration cycle apparatus according to another embodiment of the present invention, the above-described liquid level detection device is installed in the accumulator, and thereby the liquid level can be detected with erroneous determination reduced even when the liquid droplets are scattered in the gaseous part.

DETAILED DESCRIPTION

Figure 1:
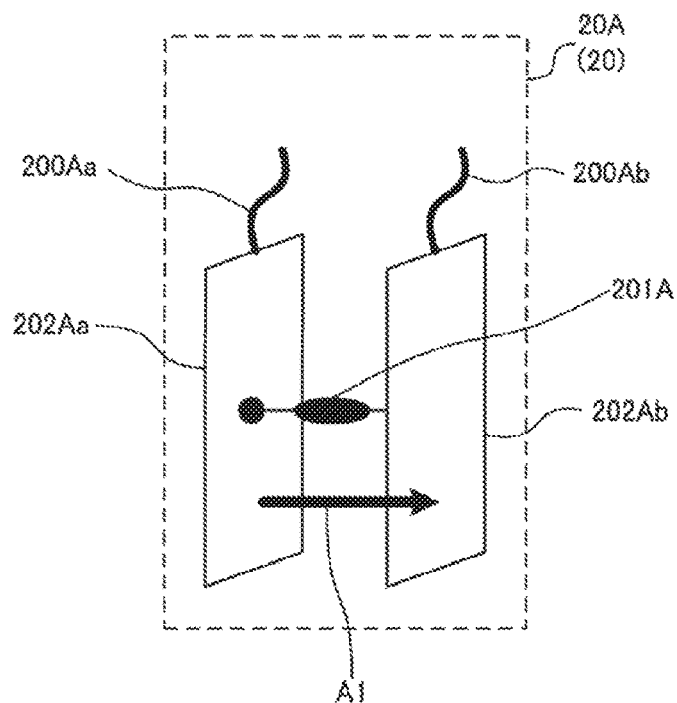
FIG. 1 is a schematic configuration diagram illustrating a schematic configuration example of a liquid level detection device according to Embodiment 1 of the present invention.

Embodiments of the present invention will be described hereinafter with reference to the drawings. Note that, the relations between the sizes of components in the following drawings including FIG. 1 may be different from the actual relations. Moreover, in the following drawings including FIG. 1, components denoted by the same reference signs are the same or corresponding components. The reference signs are common throughout the description. In addition, the forms of components described herein are for illustration purpose only, and the components are not limited to the description.

Embodiment 1

Each of FIGS. 1 to 4 is a schematic configuration diagram illustrating a schematic configuration example of a liquid level detection device 20 according to Embodiment 1 of the present invention. The liquid level detection device 20 will be described with reference to FIGS. 1 to 4. Note that the liquid level detection device 20 will be described and referred to as a liquid level detection device 20A in FIG. 1, as a liquid level detection device 20B in FIG. 2, as a liquid level detection device 20C in FIG. 3, and as a liquid level detection device 20D in FIG. 4. The liquid level detection devices 20A to 20D are described as the liquid level detection device 20, when the liquid level detection devices 20A to 20D do not need to be particularly distinguished.

The liquid level detection device 20 is installed in a vessel in which fluid to be detected is stored, and detects a liquid level position of the fluid stored in the vessel. Examples of the vessel include a vessel that forms a portion of an accumulator, a vessel that forms a portion of a receiver, a vessel that forms a portion of a compressor, and a vessel that forms a portion of an oil separator that are mounted to a refrigeration cycle apparatus. Note that the refrigeration cycle apparatus will be described in Embodiment 2.

The accumulator is disposed in a low-pressure portion of a refrigerant circuit provided in the refrigeration cycle apparatus. The receiver is disposed in a medium-pressure portion or high-pressure portion of the refrigerant circuit provided in the refrigeration cycle apparatus. The compressor is one component of the refrigerant circuit provided in the refrigeration cycle apparatus. The oil separator is provided to a discharge portion of the compressor provided in the refrigeration cycle apparatus.

Each of the accumulator and the receiver includes a vessel as a component, and stores refrigerant circulating through the refrigerant circuit as liquid refrigerant. When the liquid level detection device 20 is mounted to the accumulator or the receiver, the liquid refrigerant is a detection object of the liquid level detection device 20.

The compressor includes a vessel as a component, and stores refrigerating machine oil used in a sliding portion in the vessel. When the liquid level detection device 20 is mounted to the compressor, the refrigerating machine oil is a detection object of the liquid level detection device 20.

The oil separator includes a vessel as a component, and stores the refrigerating machine oil discharged together with the refrigerant. When the liquid level detection device 20 is mounted to the oil separator, the refrigerating machine oil is a detection object of the liquid level detection device 20.

Figure 2:
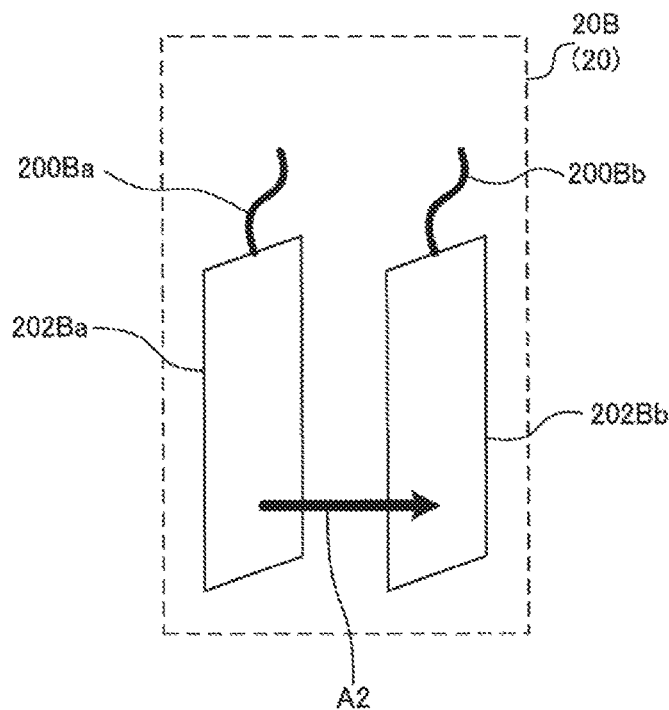
FIG. 2 is a schematic configuration diagram illustrating a schematic configuration example of the liquid level detection device according to Embodiment 1 of the present invention.
Figure 3:
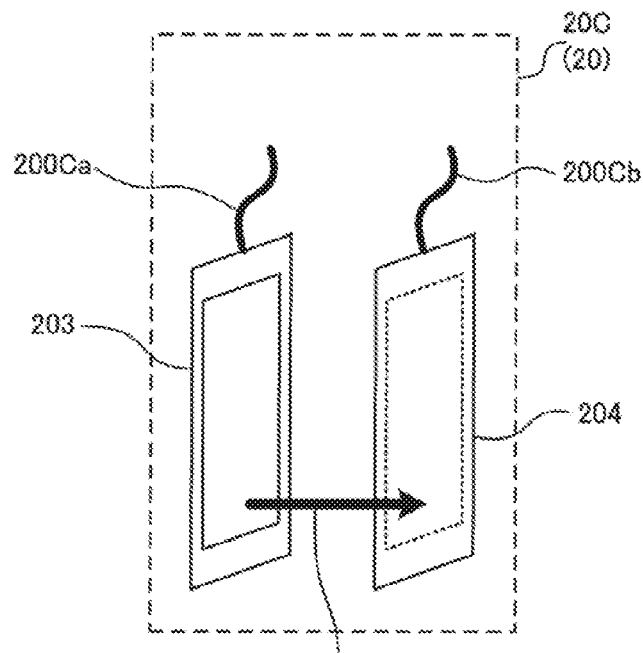
FIG. 3 is a schematic configuration diagram illustrating a schematic configuration example of the liquid level detection device according to Embodiment 1 of the present invention.
Figure 4:
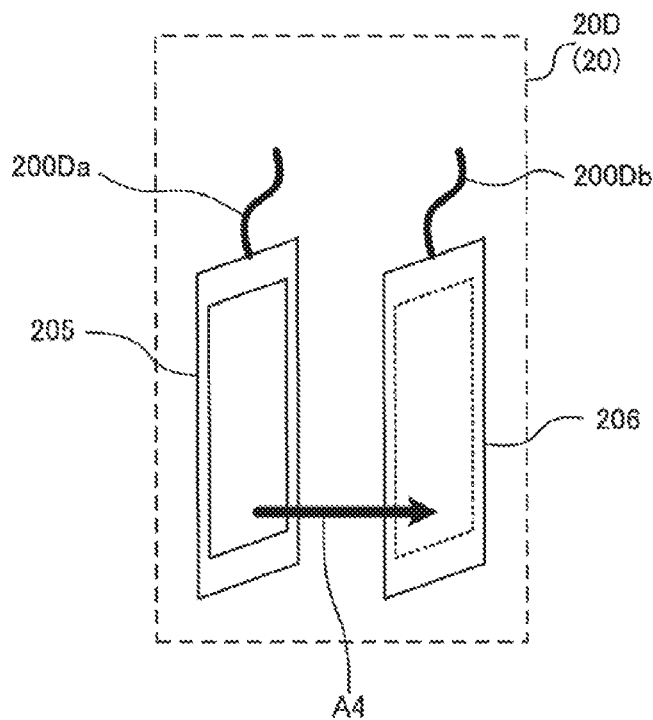
FIG. 4 is a schematic configuration diagram illustrating a schematic configuration example of the liquid level detection device according to Embodiment 1 of the present invention.

The liquid level detection device 20 is a heating type liquid level detection sensor, a capacitance type liquid level detection sensor, an ultrasonic vibration type liquid level detection sensor, or an optical liquid level detection sensor. The liquid level detection device 20A illustrated in FIG. 1 is the heating type liquid level detection sensor, the liquid level detection device 20B illustrated in FIG. 2 is the capacitance type liquid level detection sensor, the liquid level detection device 20C illustrated in FIG. 3 is the ultrasonic vibration type liquid level detection sensor, and the liquid level detection device 20D illustrated in FIG. 4 is the optical liquid level detection sensor. Firstly, a configuration of each of the liquid level detection devices 20 will be described.

<Liquid Level Detection Device 20A>

As illustrated in FIG. 1, the liquid level detection device 20A includes two electric wires 200A, two electrodes 202A, and a heat generating element 201A. In FIG. 1, an electric wire 200Aa of the two electric wires 200A is illustrated on the left in the drawing sheet, and an electric wire 200Ab of the two electric wires 200A is illustrated on the right in the drawing sheet. In addition, in FIG. 1, an electrode 202Aa of the two electrodes 202A is illustrated on the left in the drawing sheet, and an electrode 202Ab of the two electrodes 202A is illustrated on the right in the drawing sheet. The heat generating element 201A is disposed between the electrode 202Aa and the electrode 202Ab. The electrode 202Aa and the electrode 202Ab are disposed to face each other, in other words, are opposite to each other.

For example, the current is made to flow from the electrode 202Aa to the electrode 202Ab. At this time, the current flows between the electrode 202Aa and the electrode 202Ab in a direction represented by an arrow A1 in FIG. 1. That is, in FIG. 1, a current vector (i.e., a signal vector) between the electrode 202Aa and the electrode 202Ab is represented by the arrow A1.

A method of performing a liquid level detection using the heating type sensor is a method in which a sensor unit including the two electrodes 202A and the heat generating element 201A causes the heat generating element to generate heat to make a gas-liquid determination on the basis of the temperature response of the sensor unit. The liquid level detection device 20A can be made up of, for example, an NTC sensor, or a PTC sensor, which uses a change in element resistance (electric resistance) depending on an element temperature.

Note that "NTC" is an acronym of "negative temperature coefficient", and "PTC" is an acronym of "positive temperature coefficient".

The heat generating element 201A generates heat by the power supplied from a controller. The heat generating element 201A has a given relationship between its own heat (temperature) and its own resistance value. For example, when the heat generating element is used for the PTC sensor, a proportional relationship is established between its own temperature and the resistance value. Furthermore, when the heat generating element is used for the NTC sensor, an inversely proportional relationship is established between its own temperature and the resistance value.

The electrodes 202A are each made up of a plate having a front surface and a back surface. The front surface of the electrode 202Aa and the front surface of the electrode 202Ab are disposed to face each other. That is, the electrode 202Aa and the electrode 202Ab are disposed in such a manner that each of the back surface of the electrode 202Aa and the back surface of the electrode 202Ab faces outward.

The electrode 202Aa corresponds to a "first plate" of the present invention.

The electrode 202Ab corresponds to a "second plate" of the present invention.

In addition, a "surface opposite to a surface facing the second plate" means the back surface of the electrode 202Aa corresponding to the "first plate", and a "surface facing the second plate" means the front surface of the electrode 202Aa corresponding to the "first plate".

The heat generating element 201A generates heat by the supplied power, and is configured to have the size to be hidden by the electrodes 202A. That is, in a case of viewing the liquid level detection device 20A from one surface (the back surface) of each of the electrodes 202A, the heat generating element 201A is covered by the electrode 202A and hidden from view. In other words, the electrodes 202A each have a sufficient surface area for covering the whole area of the heat generating element 201A.

The liquid level detection device 20A is connected to a controller (a controller 50 illustrated in FIG. 15 described later) through wiring (electric wires 200A). The controller is configured to receive the information output from the liquid level detection device 20A. Note that FIG. 1 illustrates an example in which the liquid level detection device 20A is connected by wire with the controller, but the liquid level detection device 20A may be connected wirelessly with the controller.

<Liquid Level Detection Device 20B>

As illustrated in FIG. 2, the liquid level detection device 20B includes two electric wires 200B and two electrodes 202B. In FIG. 2, an electric wire 200Ba of the two electric wires 200B is illustrated on the left in the drawing sheet, and an electric wire 200Bb of the two electric wires 200B is illustrated on the right in the drawing sheet. In addition, in FIG. 2, an electrode 202Ba of the two electrodes 202B is illustrated on the left in the drawing sheet, and an electrode 202Bb of the two electrodes 202B is illustrated on the right in the drawing sheet. The electrode 202Ba and the electrode 202Bb are disposed to face each other, in other words, are opposite to each other.

For example, the current is made to flow from the electrode 202Ba to the electrode 202Bb. At this time, the current flows between the electrode 202Ba and the electrode 202Bb in a direction represented by an arrow A2 in FIG. 2. That is, in FIG. 2, a current vector (i.e., a signal vector) between the electrode 202Ba and the electrode 202Bb is represented by the arrow A2.

A method of performing a liquid level detection using the capacitance type sensor is a method in which a sensor unit including, for example, the two electrodes 202B is energized, and the capacitance between the electrodes 202B is measured to distinguish between gas and liquid.

The electrodes 202B are each made up of a plate having a front surface and a back surface. The front surface of the electrode 202Ba and the front surface of the electrode 202Bb are disposed to face each other. That is, the electrode 202Ba and the electrode 202Bb are disposed in such a manner that each of the back surface of the electrode 202Ba and the back surface of the electrode 202Bb faces outward.

The electrode 202Ba corresponds to a "first plate" of the present invention.

The electrode 202Bb corresponds to a "second plate" of the present invention.

In addition, a "surface opposite to a surface facing the second plate" means the back surface of the electrode 202Ba corresponding to the "first plate", and a "surface facing the second plate" means the front surface of the electrode 202Ba corresponding to the "first plate".

The liquid level detection device 20B is connected to the controller (the controller 50 illustrated in FIG. 15 described later) through wiring (electric wires 200B). The controller is configured to receive the information output from the liquid level detection device 20B. Note that FIG. 2 illustrates an example in which the liquid level detection device 20B is connected by wire with the controller, but the liquid level detection device 20B may be connected wirelessly with the controller.

<Liquid Level Detection Device 20C>

As illustrated in FIG. 3, the liquid level detection device 20C includes two electric wires 200C, a transmitter 203, and a receiver 204. In FIG. 3, an electric wire 200Ca of the two electric wires 200C is illustrated on the left in the drawing sheet, and an electric wire 200Cb of the two electric wires 200C is illustrated on the right in the drawing sheet. In addition, in FIG. 3, the transmitter 203 is illustrated on the left in the drawing sheet, and the receiver 204 is illustrated on the right in the drawing sheet, but the positional relationship between the transmitter 203 and the receiver 204 may be reversed. The transmitter 203 and the receiver 204 are disposed to face each other, in other words, are opposite to each other.

An ultrasonic wave (a wave may be a pulse or a vibration, the same applies to the following) is made to travel from the transmitter 203 to the receiver 204. At this time, the ultrasonic wave travels between the transmitter 203 and the receiver 204 in a direction represented by an arrow A3 in FIG. 3. That is, in FIG. 3, an ultrasonic wave traveling vector (i.e., a signal vector) between the transmitter 203 and the receiver 204 is represented by the arrow A3.

A method of performing a liquid level detection using the ultrasonic vibration type sensor is a method in which a sensor unit including, for example, the transmitter 203 and the receiver 204 causes the transmitter 203 to transmit the ultrasonic wave and causes the receiver 204 to receive the ultrasonic wave to distinguish between gas and liquid on the basis of the response of the sensor unit.

Each of the transmitter 203 and the receiver 204 is made up of a plate having a front surface and a back surface. The front surface of the transmitter 203 and the front surface of the receiver 204 are disposed to face each other. That is, the transmitter 203 and the receiver 204 are disposed in such a manner that each of the back surface of the transmitter 203 and the back surface of the receiver 204 faces outward.

The transmitter 203 corresponds to a "first plate" of the present invention.

The receiver 204 corresponds to a "second plate" of the present invention.

In addition, a "surface opposite to a surface facing the second plate" means the back surface of the transmitter 203 corresponding to the "first plate", and a "surface facing the second plate" means the front surface of the transmitter 203 corresponding to the "first plate".

Note that a reflector may be provided instead of the receiver 204 to reflect the ultrasonic wave and the transmitter 203 may receive the ultrasonic wave to distinguish between gas and liquid. In this case, the transmitter 203 serves as a transducer having not only a function of the transmitter 203 but also a function of the receiver 204.

The liquid level detection device 20C is connected to the controller (the controller 50 illustrated in FIG. 15 described later) through wiring (electric wires 200C). The controller is configured to receive the information output from the liquid level detection device 20C. Note that FIG. 3 illustrates an example in which the liquid level detection device 20C is connected by wire with the controller, but the liquid level detection device 20C may be connected wirelessly with the controller.

<Liquid Level Detection Device 20D>

As illustrated in FIG. 4, the liquid level detection device 20D includes two electric wires 200D, an optical transmitter 205, and an optical receiver 206. In FIG. 4, an electric wire 200Da of the two electric wires 200D is illustrated on the left in the drawing sheet, and an electric wire 200Db of the two electric wires 200D is illustrated on the right in the drawing sheet. In addition, in FIG. 4, the optical transmitter 205 is illustrated on the left in the drawing sheet, and the optical receiver 206 is illustrated on the right in the drawing sheet, but the positional relationship between the optical transmitter 205 and the optical receiver 206 may be reversed. The optical transmitter 205 and the optical receiver 206 are disposed to face each other, in other words, are opposite to each other.

Light is made to travel from the optical transmitter 205 to the optical receiver 206. At this time, the light travels between the optical transmitter 205 and the optical receiver 206 in a direction represented by an arrow A4 in FIG. 4. That is, in FIG. 4, a light traveling vector (i.e., a signal vector) between the optical transmitter 205 and the optical receiver 206 is represented by the arrow A4.

A method of performing a liquid level detection using the optical sensor is a method in which a sensor unit including, for example, the optical transmitter 205 and the optical receiver 206 causes the optical transmitter 205 to transmit the light and causes the optical receiver 206 to receive the light to distinguish between gas and liquid on the basis of the light-receiving state.

Each of the optical transmitter 205 and the optical receiver 206 is made up of a plate having a front surface and a back surface. The front surface of the optical transmitter 205 and the front surface of the optical receiver 206 are disposed to face each other. That is, the optical transmitter 205 and the optical receiver 206 are disposed in such a manner that each of the back surface of the optical transmitter 205 and the back surface of the optical receiver 206 faces outward.

The optical transmitter 205 corresponds to a "first plate" of the present invention.

The optical receiver 206 corresponds to a "second plate" of the present invention.

In addition, a "surface opposite to a surface facing the second plate" means the back surface of the optical transmitter 205 corresponding to the "first plate", and a "surface facing the second plate" means the front surface of the optical transmitter 205 corresponding to the "first plate".

Note that a reflector may be provided instead of the optical receiver 206 to reflect the light and the optical transmitter 205 may receive the light to distinguish between gas and liquid. In this case, the optical transmitter 205 serves as an optical transceiver having not only a function of the optical transmitter 205 but also a function of the optical receiver 206.

The liquid level detection device 20D is connected to the controller (the controller 50 illustrated in FIG. 15 described later) through wiring (electric wires 200D). The controller is configured to receive the information output from the liquid level detection device 20D. Note that FIG. 4 illustrates an example in which the liquid level detection device 20D is connected by wire with the controller, but the liquid level detection device 20D may be connected wirelessly with the controller.

Next, a vessel to which the liquid level detection device 20 is mounted will be described.

Each of FIGS. 5 to 8 is a schematic configuration diagram illustrating a schematic configuration example of a liquid storage reservoir 15 to which the liquid level detection device 20 is mounted. The liquid storage reservoir 15 will be described with reference to FIGS. 5 to 8. Note that the liquid storage reservoir 15 will be described and referred to as a liquid storage reservoir 15A in FIG. 5, as a liquid storage reservoir 15B in FIG. 6, as a liquid storage reservoir 15C in FIG. 7, and as a liquid storage reservoir 15D in FIG. 8. The liquid storage reservoirs 15A to 15D are described as the liquid storage reservoir 15, when the liquid storage reservoirs 15A to 15D do not need to be particularly distinguished.

<Liquid Storage Reservoir 15A>

Figure 5:
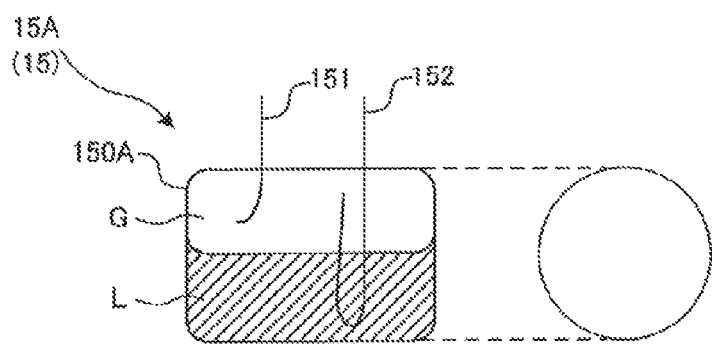
FIG. 5 is a schematic configuration diagram illustrating a schematic configuration example of a liquid storage reservoir to which the liquid level detection device according to Embodiment 1 of the present invention is mounted.

The liquid storage reservoir 15A is used as a component of, for example, an accumulator or a receiver. As illustrated in FIG. 5, the liquid storage reservoir 15A has an outer appearance formed in a cylindrical shape, and is placed in such a manner that an axial center of the cylindrical shape is horizontal. That is, the liquid storage reservoir 15A is a horizontal vessel. The liquid storage reservoir 15A may be made up of, for example, a pressure vessel having a wall thickness of from about 4 mm to about 10 mm. Note that FIG. 5 schematically illustrates a state in which liquid refrigerant L and gas refrigerant G are present inside the liquid storage reservoir 15A.

The liquid storage reservoir 15A has a vessel main body 150A capable of storing the liquid refrigerant L. In addition, the liquid storage reservoir 15A has an inlet pipe 151 connected to an upper surface portion of the vessel main body 150A and allowing the refrigerant to flow in through the inlet pipe 151. Furthermore, the liquid storage reservoir 15A has an outlet pipe 152 connected to the upper surface portion of the vessel main body 150A and allowing the refrigerant that is present inside the vessel main body 150A to flow out through the outlet pipe 152.

The liquid storage reservoir 15A is disposed between the evaporator and the compressor forming portions of a refrigeration cycle, for example. In a state in which the refrigerant circulates through a refrigerant circuit of the refrigeration cycle apparatus (see FIG. 15 described later), the refrigerant passing through the evaporator flows into the vessel main body 150A through the inlet pipe 151, and is separated into the liquid refrigerant L and the gas refrigerant G in the vessel main body 150A. The gas refrigerant G, which is lighter than the liquid refrigerant, flows upward in the vessel main body 150A, flows out of the vessel main body 150A through the outlet pipe 152, and then is suctioned into the compressor. On the other hand, the liquid refrigerant L, which is heavier than the gas refrigerant, flows downward in the vessel main body 150A, and is stored in a bottom portion of the vessel main body 150A.

<Liquid Storage Reservoir 15B>

Figure 6:
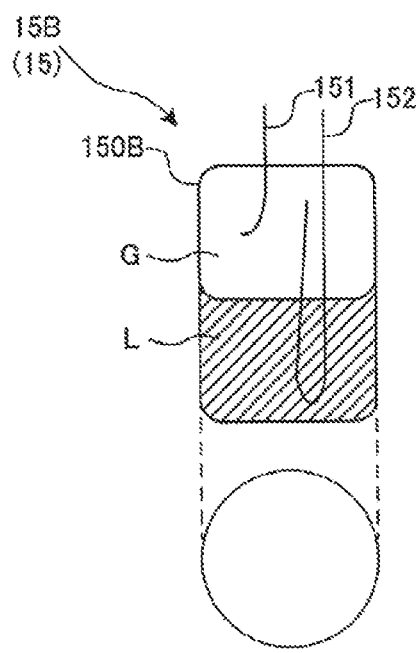
FIG. 6 is a schematic configuration diagram illustrating a schematic configuration example of a liquid storage reservoir to which the liquid level detection device according to Embodiment 1 of the present invention is mounted.

The liquid storage reservoir 15B is used as a component of, for example, an accumulator, a receiver, or an oil separator. As illustrated in FIG. 6, the liquid storage reservoir 15B has an outer appearance formed in a cylindrical shape, and is placed in such a manner that an axial center of the cylindrical shape is vertical. That is, the liquid storage reservoir 15B is a vertical vessel. The liquid storage reservoir 15B may be made up of, for example, a pressure vessel having a wall thickness of from about 4 mm to about 10 mm.

Note that FIG. 6 schematically illustrates a state in which liquid refrigerant L and gas refrigerant G are present inside the liquid storage reservoir 15B. Note that when the liquid storage reservoir 15B is used as the oil separator, the refrigerating machine oil is stored instead of the liquid refrigerant L.

The liquid storage reservoir 15B has a vessel main body 150B capable of storing the liquid refrigerant L or the refrigerating machine oil. In addition, the liquid storage reservoir 15B has an inlet pipe 151 connected to an upper surface portion of the vessel main body 150B and allowing the refrigerant to flow in through the inlet pipe 151. Furthermore, the liquid storage reservoir 15B has an outlet pipe 152 connected to the upper surface portion of the vessel main body 150B and allowing the refrigerant that is present inside the vessel main body 150B to flow out through the outlet pipe 152.

The liquid storage reservoir 15B is disposed between the evaporator and the compressor forming portions of a refrigeration cycle, for example. In a state in which the refrigerant circulates through a refrigerant circuit of the refrigeration cycle apparatus (see FIG. 15 described later), the refrigerant passing through the evaporator flows into the vessel main body 150B through the inlet pipe 151, and is separated into the liquid refrigerant L and the gas refrigerant G in the vessel main body 150B. The gas refrigerant G, which is lighter than the liquid refrigerant, flows upward in the vessel main body 150B, flows out of the vessel main body 150B through the outlet pipe 152, and then is suctioned into the compressor. On the other hand, the liquid refrigerant L, which is heavier than the gas refrigerant, flows downward in the vessel main body 150B, and is stored in a bottom portion of the vessel main body 150B.

Alternatively, the liquid storage reservoir 15B is connected to a discharge portion of the compressor forming a portion of the refrigeration cycle, for example. In a state in which the refrigerant circulates through a refrigerant circuit of the refrigeration cycle apparatus (see FIG. 15 described later), the refrigerant discharged from the compressor flows into the vessel main body 150B through the inlet pipe 151, and swirls in the vessel main body 150B. This swirl flow enables the refrigerating machine oil to be separated from the refrigerant. The gas refrigerant G, which is lighter than the refrigerating machine oil, flows out of the oil separator through the outlet pipe 152, and then flows into the condenser connected downstream of the oil separator. On the other hand, the refrigerating machine oil, which is heavier than the gas refrigerant, falls downward in the vessel main body 150B dropwise to be thereby stored in the bottom portion of the vessel main body 150B.

<Liquid Storage Reservoir 150>

Figure 7:
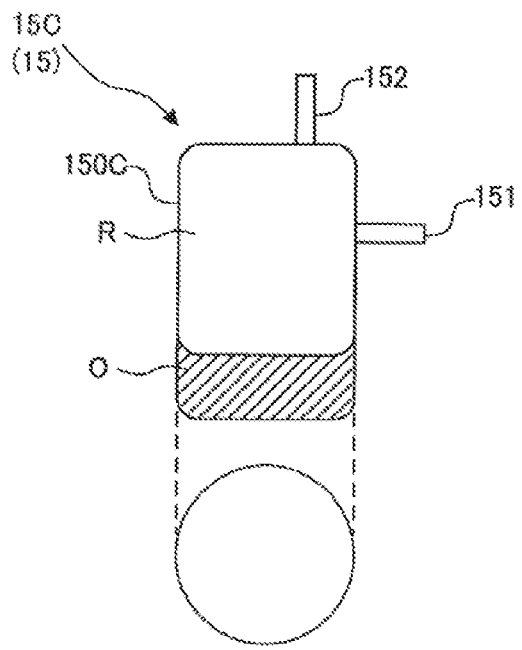
FIG. 7 is a schematic configuration diagram illustrating a schematic configuration example of a liquid storage reservoir to which the liquid level detection device according to Embodiment 1 of the present invention is mounted.

The liquid storage reservoir 15C is used as a component of, for example, a compressor or an oil separator. As illustrated in FIG. 7, the liquid storage reservoir 15C has an outer appearance formed in a cylindrical shape, and is placed in such a manner that an axial center of the cylindrical shape is vertical. That is, the liquid storage reservoir 15C is a vertical vessel. The liquid storage reservoir 15C may be made up of, for example, a pressure vessel having a wall thickness of from about 4 mm to about 10 mm. Note that FIG. 7 schematically illustrates a state in which refrigerant R and refrigerating machine oil O are present inside the liquid storage reservoir 15C.

The liquid storage reservoir 15C has a vessel main body 150C capable of storing the refrigerating machine oil O. In addition, the liquid storage reservoir 15C has an inlet pipe 151 connected to a side surface portion of the vessel main body 150C and allowing the refrigerant to flow in through the inlet pipe 151. Furthermore, the liquid storage reservoir 15C has an outlet pipe 152 connected to an upper surface portion of the vessel main body 150C and allowing the refrigerant that is present inside the vessel main body 150C to flow out through the outlet pipe 152.

In a state in which the refrigerant circulates through a refrigerant circuit of the refrigeration cycle apparatus (see FIG. 15 described later), the refrigerant R flows into the vessel main body 150C through the inlet pipe 151, and the refrigerating machine oil O is separated from the refrigerant R in the vessel main body 150C. The refrigerant R from which the refrigerating machine oil O is separated flows out of the vessel main body 150C through the outlet pipe 152. On the other hand, the refrigerating machine oil O flows downward in the vessel main body 150C, and is stored in a bottom portion of the vessel main body 150C.

<Liquid Storage Reservoir 15D>

Figure 8:
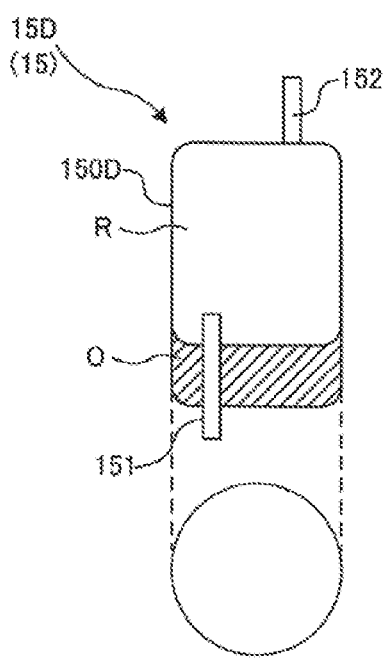
FIG. 8 is a schematic configuration diagram illustrating a schematic configuration example of a liquid storage reservoir to which the liquid level detection device according to Embodiment 1 of the present invention is mounted.

The liquid storage reservoir 15D is used as a component of, for example, a compressor or an oil separator. As illustrated in FIG. 8, the liquid storage reservoir 15D has an outer appearance formed in a cylindrical shape, and is placed in such a manner that an axial center of the cylindrical shape is vertical. That is, the liquid storage reservoir 15D is a vertical vessel. The liquid storage reservoir 15D may be made up of, for example, a pressure vessel having a wall thickness of from about 4 mm to about 10 mm. Note that FIG. 8 schematically illustrates a state in which refrigerant R and refrigerating machine oil O are present inside the liquid storage reservoir 15D.

The liquid storage reservoir 15D has a vessel main body 150D capable of storing the refrigerating machine oil O. In addition, the liquid storage reservoir 15D has an inlet pipe 151 connected to a bottom surface portion of the vessel main body 150D and allowing the refrigerant to flow in through the inlet pipe 151. Furthermore, the liquid storage reservoir 15D has an outlet pipe 152 connected to an upper surface portion of the vessel main body 150D and allowing the refrigerant that is present inside the vessel main body 150D to flow out through the outlet pipe 152.

In a state in which the refrigerant circulates through a refrigerant circuit of the refrigeration cycle apparatus (see FIG. 15 described later), the refrigerant R flows into the vessel main body 150D through the inlet pipe 151, and the refrigerating machine oil O is separated from the refrigerant R in the vessel main body 150D. The refrigerant R from which the refrigerating machine oil O is separated flows out of the vessel main body 150D through the outlet pipe 152. On the other hand, the refrigerating machine oil O flows downward in the vessel main body 150D, and is stored in a bottom portion of the vessel main body 150D.

<Installation Method of Liquid Level Detection Device 20 in Horizontal Vessel>

Figure 9:
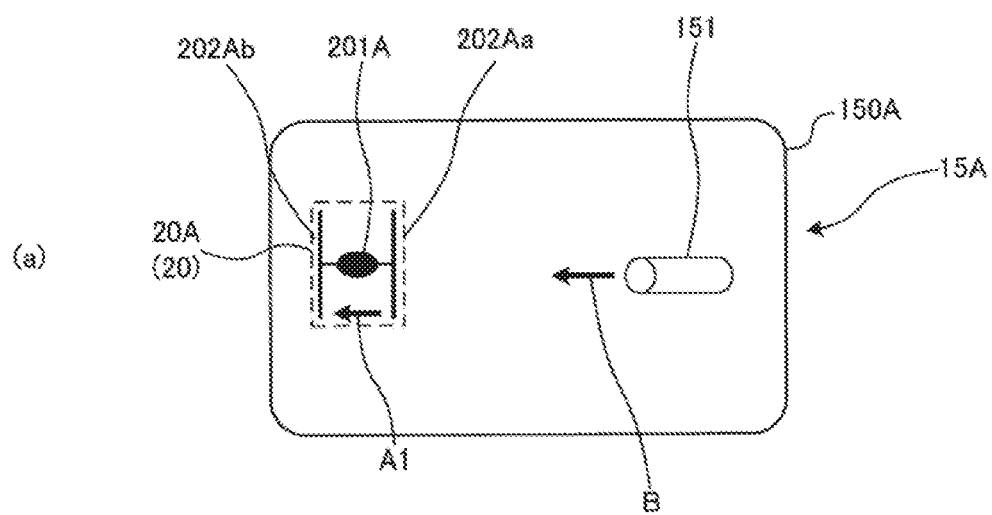
FIG. 9 includes schematic diagrams illustrating an example of installation method of the liquid level detection device according to Embodiment 1 of the present invention in a horizontal vessel.
Figure 9:
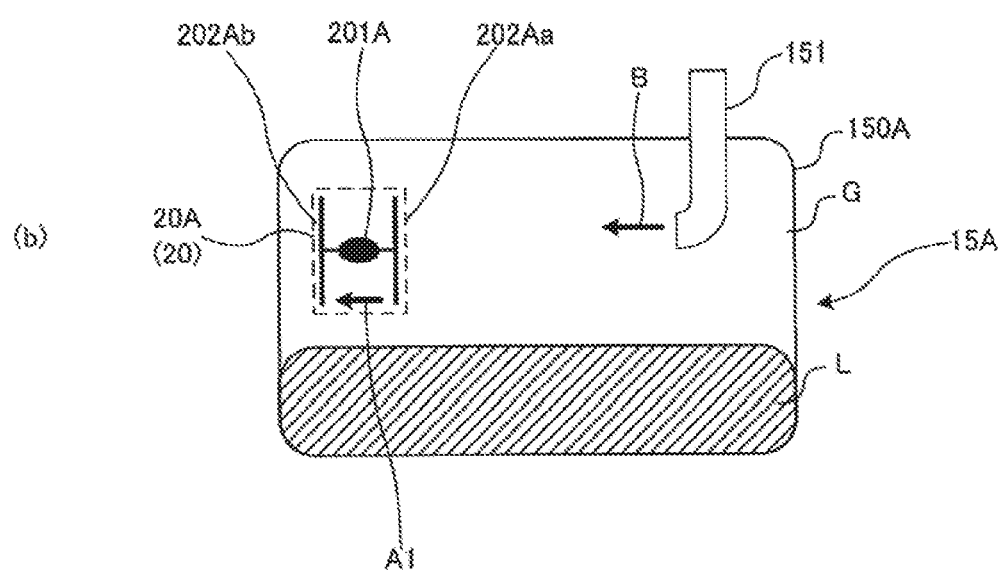
Figure 10:
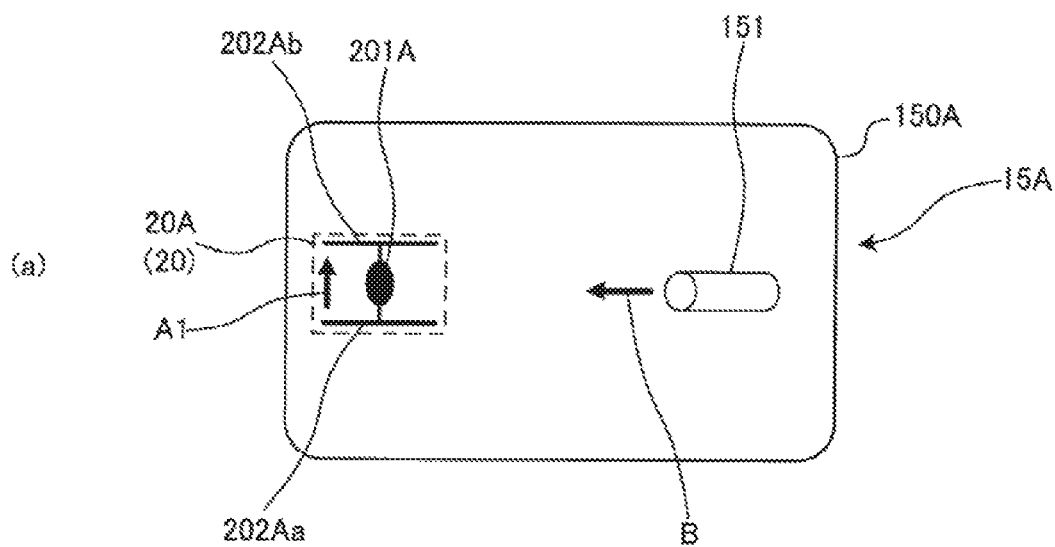
FIG. 10 includes schematic diagrams illustrating an example of installation method of a liquid level detection device in a horizontal vessel, as a comparative example.
Figure 10:
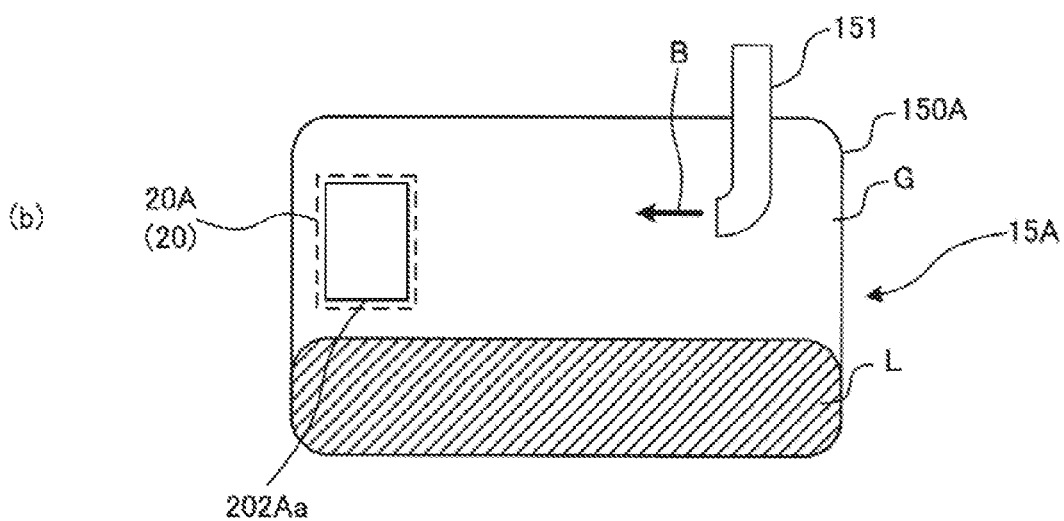

An installation method of the liquid level detection device 20 in the horizontal vessel will be described with, as an example, the liquid level detection device 20A. FIG. 9 includes schematic diagrams illustrating an example of installation method of the liquid level detection device 20 in the horizontal vessel. FIG. 10 includes schematic diagrams illustrating an example of installation method of a liquid level detection device 20 in the horizontal vessel, as a comparative example. FIG. 9(a) is a diagram schematically illustrating a state in which the liquid storage reservoir 15A is viewed from its bottom surface, and FIG. 9(b) is a diagram schematically illustrating a state in which the liquid storage reservoir 15A is viewed from its side surface. FIG. 10(a) is a diagram schematically illustrating a state in which the liquid storage reservoir 15A is viewed from the bottom surface, and FIG. 10(b) is a diagram schematically illustrating a state in which the liquid storage reservoir 15A is viewed from the side surface.

In each of FIG. 9 and FIG. 10, a case in which the liquid level detection device 20A is installed in the liquid storage reservoir 15A, which is the horizontal vessel illustrated in FIG. 5, is described as an example. Note that each of FIG. 9 and FIG. 10 does not illustrate the electric wires 200A and the outlet pipe 152.

As illustrated in each of FIG. 9 and FIG. 10, the liquid level detection device 20A is installed in the vessel main body 150A of the liquid storage reservoir 15A. The liquid level detection device 20A is mounted at, for example, a lower limit position or an upper limit position of the fluid (e.g., liquid refrigerant) stored in the vessel main body 150A. Note that the number of the liquid level detection devices 20A to be installed is not limited to a particular value and a position at which the liquid level detection device 20A is installed is not limited to a particular position, and the number and the positions of the liquid level detection devices 20A may be appropriately determined depending on the application and the volume of the liquid storage reservoir 15 to be installed and the type of fluid to be stored in the liquid storage reservoir 15.

The liquid level detection device 20A illustrated in FIG. 9 detects a liquid level of the liquid refrigerant L that flows from the inlet pipe 151 and is stored in the vessel main body 150A. A case is described in which the liquid storage reservoir 15A in which the liquid level detection device 20A is installed as illustrated in FIG. 9 is a vessel of an accumulator or a receiver.

The refrigerant circulating through the refrigerant circuit included in the refrigeration cycle apparatus flows into the vessel main body 150A, and the liquid refrigerant L is stored in the vessel main body 150A. To operate the refrigeration cycle apparatus efficiently, it is important to obtain information on the amount of the refrigerant circulating through the refrigerant circuit. That is, when information on the amount of the refrigerant is not obtained, the detection of a shortage of refrigerant or refrigerant leakage is delayed, and the refrigeration cycle apparatus cannot be therefore operated efficiently. To this end, using the liquid level detection device 20 allows the liquid level of the liquid refrigerant L to be detected, and thereby information on the amount of the refrigerant can be obtained on the basis of the storage amount of the liquid refrigerant L.

As illustrated in FIG. 9, the electrode 202Aa and the electrode 202Ab are disposed to face each other, and the electrode 202Aa is disposed in such a manner that the back surface of the electrode 202Aa is orthogonal to a direction in which the fluid around the position at which the liquid level detection device 20A is installed flows. That is, in an installation example illustrated in FIG. 9, the liquid level detection device 20A is installed in such a manner that the signal vector (the arrow A1) of a signal traveling between the electrodes 202A is parallel to a streamline vector (the arrow B) of the fluid flowing into the liquid storage reservoir 15A and then flowing around the liquid level detection device 20A. Note that the back surface of the electrode 202Aa does not need to be exactly orthogonal to the direction in which the fluid flows, and a slight shift (a range of ±10 degrees) is allowed. (The same also applies to the liquid level detection device 20C to the liquid level detection device 20D.)

When the liquid level detection device 20A is thus installed, one of the electrodes 202A can prevent liquid droplets of the fluid having flowed into the vessel main body 150A from the inlet pipe 151 from being in contact with the heat generating element 201A. That is, the one of the electrodes 202A also serves as a shielding portion. Consequently, in the vessel main body 150A, the fluid flowing around the liquid level detection device 20A collides with the one of the electrodes 202A, the flow of the fluid is interrupted, and thus the fluid does not reach the heat generating element 201A.

On the other hand, in FIG. 10, a case in which the electrode 202Aa and the electrode 202Ab facing each other are disposed to be parallel to the flow of the fluid around a position at which the liquid level detection device 20A is installed is described as a comparative example. That is, in an installation example illustrated in FIG. 10, the liquid level detection device 20A is installed in such a manner that the signal vector (the arrow A1) of a signal traveling between the electrodes 202A is orthogonal to a streamline vector (the arrow B) of the fluid flowing into the liquid storage reservoir 15A and then flowing around the liquid level detection device 20A.

When the liquid level detection device 20A is thus installed, the liquid droplets of the fluid having flowed into the vessel main body 150A from the inlet pipe 151 inconveniently come into contact with the heat generating element 201A without being interfered by the electrodes 202A. Consequently, the fluid reaches the heat generating element 201A. In such a case, the temperature response of the heat generating element 201A changes due to the influence of liquid droplets, thereby causing the possibility of erroneous determination of the liquid level detection device 20A.

As described above, when the liquid level detection device 20A is installed as illustrated in FIG. 9, the liquid droplets are not in contact with the heat generating element 201A. Thus, the liquid level detection device 20A does not erroneously determine a gaseous part as a liquid part, that is, does not make false detection.

On the other hand, when the liquid level detection device 20A is installed as illustrated in FIG. 10, the liquid droplets are highly likely to come into contact with the heat generating element 201A. Thus, the liquid level detection device 20A erroneously determines a gaseous part as a liquid part due to the liquid droplets, that is, makes false detection.

<Installation Method (No. 1) of Liquid Level Detection Device 20 in Vertical Vessel>

Figure 11:
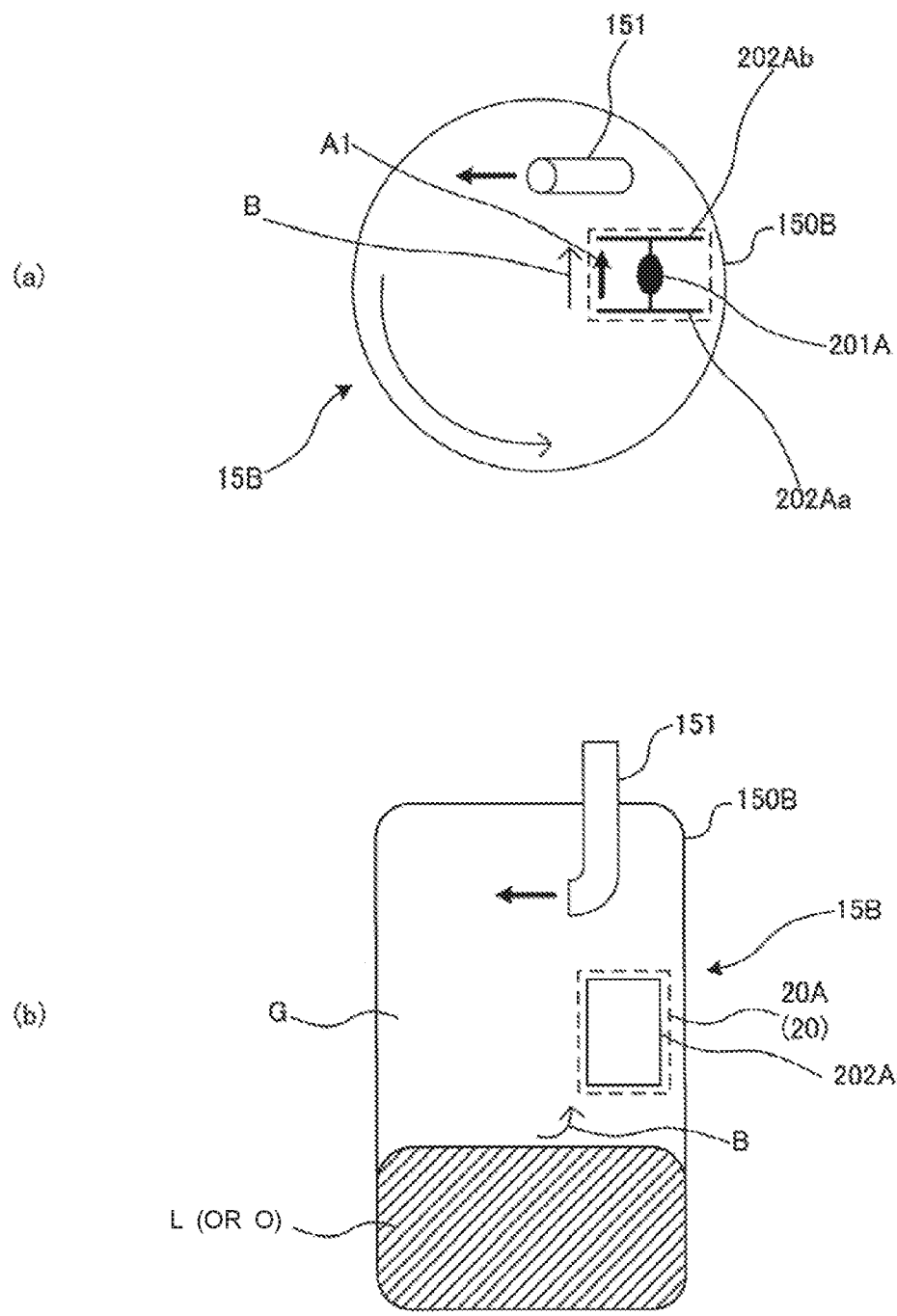
FIG. 11 includes schematic diagrams illustrating an example of installation method of the liquid level detection device according to Embodiment 1 of the present invention in a vertical vessel.
Figure 12:
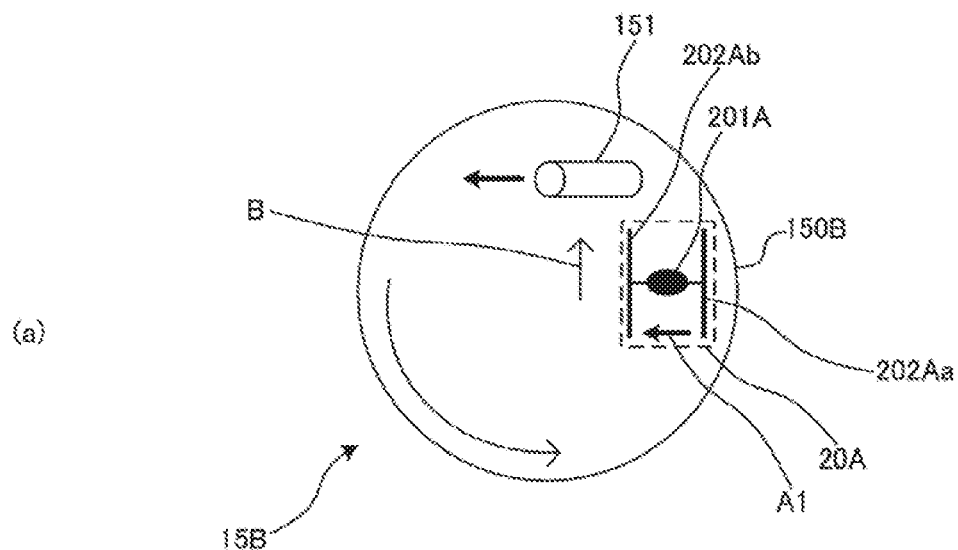
FIG. 12 includes schematic diagrams illustrating an example of installation method of the liquid level detection device in a vertical vessel, as a comparative example.
Figure 12:
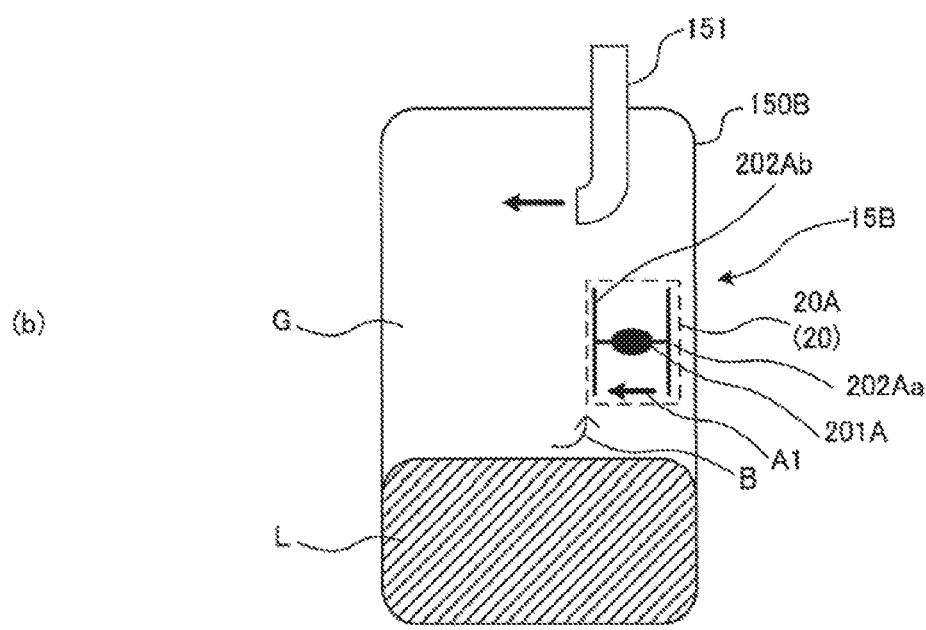

An installation method (No. 1) of the liquid level detection device 20 in the vertical vessel will be described with, as an example, the liquid level detection device 20A. FIG. 11 includes schematic diagrams illustrating an example of installation method of the liquid level detection device 20 in the vertical vessel. FIG. 12 includes schematic diagrams illustrating an example of installation method of a liquid level detection device in the vertical vessel, as a comparative example. FIG. 11(a) is a diagram schematically illustrating a state in which the liquid storage reservoir 15B is viewed from its bottom surface, and FIG. 11(b) is a diagram schematically illustrating a state in which the liquid storage reservoir 15B is viewed from its side surface. FIG. 12(a) is a diagram schematically illustrating a state in which the liquid storage reservoir 15B is viewed from the bottom surface, and FIG. 12(b) is a diagram schematically illustrating a state in which the liquid storage reservoir 15B is viewed from the side surface.

In each of FIG. 11 and FIG. 12, a case in which the liquid level detection device 20A is installed in the liquid storage reservoir 15B, which is the vertical vessel illustrated in FIG. 6, is described as an example. Note that each of FIG. 11 and FIG. 12 does not illustrate the electric wires 200A and the outlet pipe 152.

As illustrated in each of FIG. 11 and FIG. 12, the liquid level detection device 20A is installed in the vessel main body 150B of the liquid storage reservoir 15B. The liquid level detection device 20A is mounted at, for example, a lower limit position or an upper limit position of the fluid (e.g., liquid refrigerant) stored in the vessel main body 150B. Note that the number of the liquid level detection devices 20A to be installed is not limited to a particular value and a position at which the liquid level detection device 20A is installed is not limited to a particular position, and the number and the positions of the liquid level detection devices 20A may be appropriately determined depending on the application and the volume of the liquid storage reservoir 15 to be installed and the type of fluid to be stored in the liquid storage reservoir 15.

The liquid level detection device 20A illustrated in FIG. 11 detects a liquid level of the liquid refrigerant L or the refrigerating machine oil O that flows from the inlet pipe 151 and is stored in the vessel main body 150B. A case is described in which the liquid storage reservoir 15B in which the liquid level detection device 20A is installed as illustrated in FIG. 11 is a vessel of an accumulator, a receiver, or an oil separator.

When the liquid storage reservoir 15B is used as a component of an accumulator or a receiver, the refrigerant circulating through the refrigerant circuit included in the refrigeration cycle apparatus flows into the vessel main body 150B, and the liquid refrigerant L is stored in the vessel main body 150B. To operate the refrigeration cycle apparatus efficiently, it is important to obtain information on the amount of the refrigerant, and the liquid level detection device 20 is therefore used to obtain information on the amount of the refrigerant on the basis of the storage amount of the liquid refrigerant L.

When the liquid storage reservoir 15B is used as a component of an oil separator, the refrigerating machine oil O flows into the vessel main body 150B together with the refrigerant, and the refrigerating machine oil O is separated from the refrigerant R to be thereby stored in the bottom portion of the vessel main body 150B. That is, the refrigerating machine oil O is discharged to the outside of the compressor together with the refrigerant R.

Using the oil separator allows the refrigerating machine oil O to be returned to the compressor, to thereby prevent depletion of the refrigerating machine oil O in the compressor. On the other hand, when an operation in which the refrigerating machine oil O is returned to the compressor from the oil separator is constantly executed, the operation efficiency of the refrigeration cycle apparatus is reduced. Then, the liquid level of the refrigerating machine oil O is detected using the liquid level detection device 20, to thereby optimize the oil return timing to the compressor and prevent the operation efficiency of the refrigeration cycle apparatus from being reduced.

As illustrated in FIG. 11, the electrode 202Aa and the electrode 202Ab are disposed to face each other, and the electrode 202Aa is disposed in such a manner that the back surface of the electrode 202Aa is orthogonal to a direction in which the fluid around the position at which the liquid level detection device 20A is installed flows. The fluid having flowed into the vessel main body 150B of the liquid storage reservoir 15B from the inlet pipe 151 flows while swirling along the wall surface of the vessel main body 150B. Then, in an installation example illustrated in FIG. 11, the liquid level detection device 20A is installed in such a manner that the signal vector (the arrow A1) of a signal traveling between the electrodes 202A is parallel to a streamline vector (the arrow B) of the fluid flowing into the liquid storage reservoir 15B and then flowing around the liquid level detection device 20A.

When the liquid level detection device 20A is thus installed, one of the electrodes 202A can prevent liquid droplets of the fluid having flowed into the vessel main body 150B from the inlet pipe 151 from being in contact with the heat generating element 201A. That is, the one of the electrodes 202A also serves as a shielding portion. Consequently, in the vessel main body 150B, the fluid flowing around the liquid level detection device 20A collides with the one of the electrodes 202A, the flow of the fluid is interrupted, and thus the fluid does not reach the heat generating element 201A.

On the other hand, in FIG. 12, a case in which the electrode 202Aa and the electrode 202Ab facing each other are disposed to be parallel to the flow of the fluid around a position at which the liquid level detection device 20A is installed is described as a comparative example. That is, in an installation example illustrated in FIG. 12, the liquid level detection device 20A is installed in such a manner that the signal vector (the arrow A1) of a signal traveling between the electrodes 202A is orthogonal to a streamline vector (the arrow B) of the fluid flowing into the liquid storage reservoir 15B and then flowing around the liquid level detection device 20A.

When the liquid level detection device 20A is thus installed, the liquid droplets of the fluid having flowed into the vessel main body 150B from the inlet pipe 151 inconveniently come into contact with the heat generating element 201A without being interfered by the electrodes 202A. Consequently, the fluid reaches the heat generating element 201A. In such a case, the temperature response of the heat generating element 201A changes due to the influence of liquid droplets, thereby causing the possibility of erroneous determination of the liquid level detection device 20A.

As described above, when the liquid level detection device 20A is installed as illustrated in FIG. 11, the liquid droplets are not in contact with the heat generating element 201A. Thus, the liquid level detection device 20A does not erroneously determine a gaseous part as a liquid part, that is, does not make false detection.

On the other hand, when the liquid level detection device 20A is installed as illustrated in FIG. 12, the liquid droplets are highly likely to come into contact with the heat generating element 201A. Thus, the liquid level detection device 20A erroneously determines a gaseous part as a liquid part due to the liquid droplets, that is, makes false detection.

<Installation Method (No. 2) of Liquid Level Detection Device 20 in Vertical Vessel>

Figure 13:
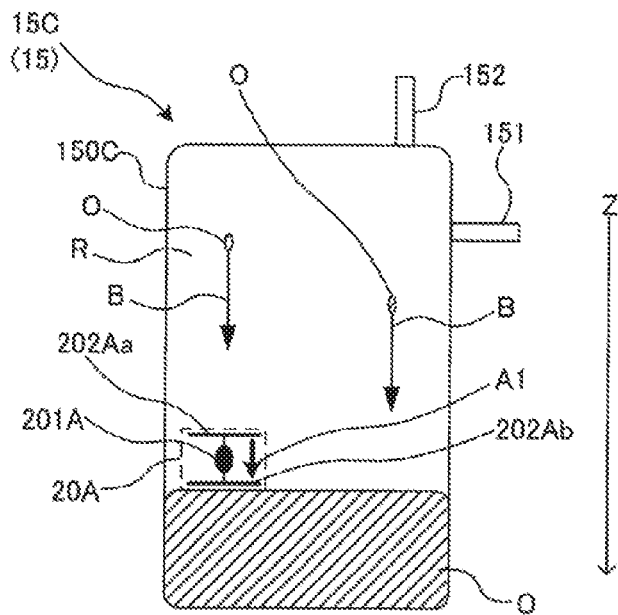
FIG. 13 is a schematic diagram illustrating an example of installation method of the liquid level detection device according to Embodiment 1 of the present invention in a vertical vessel.
Figure 14:
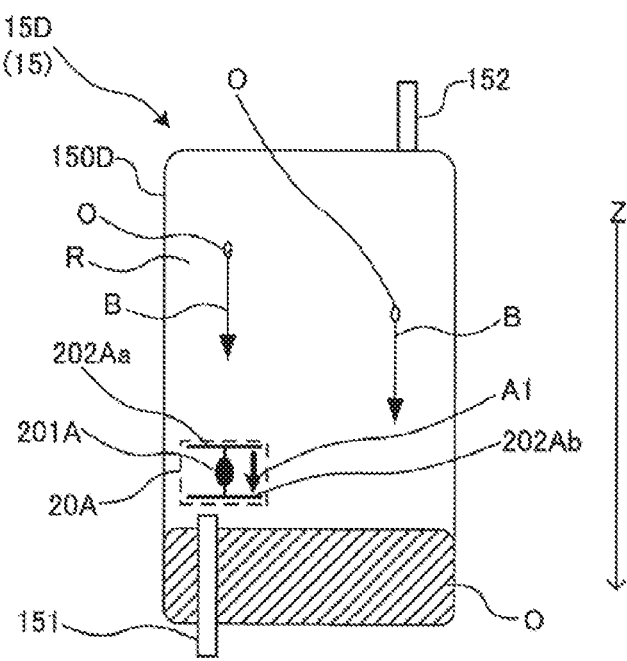
FIG. 14 is a schematic diagram illustrating an example of installation method of the liquid level detection device according to Embodiment 1 of the present invention in a vertical vessel.

An installation method (No. 2) of the liquid level detection device 20 in the vertical vessel will be described with, as an example, the liquid level detection device 20A. Each of FIG. 13 and FIG. 14 is a schematic diagram illustrating an example of installation method of the liquid level detection device 20 in the vertical vessel. An arrow Z represented in each of FIG. 13 and FIG. 14 shows the gravity direction.

In FIG. 13, a case in which the liquid level detection device 20A is installed in the liquid storage reservoir 15C, which is the vertical vessel illustrated in FIG. 7, is described as an example. In FIG. 14, a case in which the liquid level detection device 20A is installed in the liquid storage reservoir 15D, which is the vertical vessel illustrated in FIG. 8, is described as an example. Note that each of FIG. 13 and FIG. 14 does not illustrate the electric wires 200A. In FIG. 13 and FIG. 14, a state in which refrigerant R and refrigerating machine oil O are present inside the vessel main body 150C (in FIG. 13) and the vessel main body 150D (in FIG. 14) is schematically illustrated.

Firstly, the installation of the liquid level detection device 20 will be described with reference to FIG. 13.

As illustrated in FIG. 13, the liquid level detection device 20A is installed in the vessel main body 150C of the liquid storage reservoir 15C. The liquid level detection device 20A is mounted at, for example, a lower limit position or an upper limit position of the fluid (e.g., refrigerating machine oil) stored in the vessel main body 150C. Note that the number of the liquid level detection devices 20A to be installed is not limited to a particular value and a position at which the liquid level detection device 20A is installed is not limited to a particular position, and the number and the positions of the liquid level detection devices 20A may be appropriately determined depending on the application and the volume of the liquid storage reservoir 15 to be installed and the type of fluid to be stored in the liquid storage reservoir 15.

The liquid level detection device 20A illustrated in FIG. 13 detects not a liquid level of the refrigerant R having flowed from the inlet pipe 151 but the liquid level of the refrigerating machine oil O, which is the fluid different from the refrigerant R. A case is described in which the liquid storage reservoir 15C in which the liquid level detection device 20A is installed as illustrated in FIG. 13 is a vessel used as a compressor or an oil separator.

When the liquid storage reservoir 15C is used as a compressor, the refrigerating machine oil O flows into the vessel main body 150C together with the refrigerant, and the refrigerating machine oil O is separated from the refrigerant R to be thereby stored in the bottom portion (an oil sump 115 illustrated in FIG. 16) of the vessel main body 150C. The refrigerating machine oil O is supplied to the sliding portion (e.g., a bearing and a thrust bearing) of a compression unit (a compression unit 112 illustrated in FIG. 16) that compresses the refrigerant, to lubricate the sliding portion, and then is returned to the bottom portion of the vessel main body 150C. The refrigerating machine oil O is discharged to the outside of the compressor together with the refrigerant R.

When the refrigerating machine oil O stored in the vessel main body 150C is depleted, the sliding portion of the compression unit cannot be sufficiently lubricated. Then, the liquid level of the refrigerating machine oil O is detected using the liquid level detection device 20, to thereby obtain information on the storage amount of the refrigerating machine oil O remaining in the compressor.

The description of a case in which the liquid storage reservoir 15C is used as an oil separator is similar to that illustrated in FIG. 11.

As illustrated in FIG. 13, the electrode 202Aa and the electrode 202Ab are disposed to face each other, and the electrode 202Aa is disposed in such a manner that the back surface of the electrode 202Aa is orthogonal to a direction in which the refrigerating machine oil O dropping from an upper portion to a lower portion of the vessel main body 150C flows. The refrigerating machine oil O used in the sliding portion of the compressor or the refrigerating machine oil O separated from the refrigerant R drops from an upper portion to a lower portion of the vessel main body 150C by gravity. In an installation example illustrated in FIG. 13, the liquid level detection device 20A is installed in such a manner that the signal vector (the arrow A1) of a signal traveling between the electrodes 202A is parallel to a streamline vector (the arrow B) of the fluid dropping in the vessel main body 150C.

When the liquid level detection device 20A is thus installed, one of the electrodes 202A can prevent liquid droplets of the fluid dropping in the vessel main body 150C from being in contact with the heat generating element 201A. That is, the one of the electrodes 202A also serves as a shielding portion. Consequently, in the vessel main body 150C, the fluid dropping toward the liquid level detection device 20A collides with the one of the electrodes 202A, the flow of the fluid is interrupted, and thus the fluid does not reach the heat generating element 201A.

As described above, when the liquid level detection device 20A is installed as illustrated in FIG. 13, the liquid droplets are not in contact with the heat generating element 201A. Thus, the liquid level detection device 20A does not erroneously determine a gaseous part as a liquid part, that is, does not make false detection.

Next, the installation of the liquid level detection device 20 will be described with reference to FIG. 14.

As illustrated in FIG. 14, the liquid level detection device 20A is installed in the vessel main body 150D of the liquid storage reservoir 15D. The liquid level detection device 20A is mounted at, for example, a lower limit position or an upper limit position of the fluid (e.g., refrigerating machine oil) stored in the vessel main body 150D. Note that the number of the liquid level detection devices 20A to be installed is not limited to a particular value and a position at which the liquid level detection device 20A is installed is not limited to a particular position, and the number and the positions of the liquid level detection devices 20A may be appropriately determined depending on the application and the volume of the liquid storage reservoir 15 to be installed and the type of fluid to be stored in the liquid storage reservoir 15.

The liquid level detection device 20A illustrated in FIG. 14 detects not a liquid level of the refrigerant R having flowed from the inlet pipe 151 but the liquid level of the refrigerating machine oil O, which is the fluid different from the refrigerant R. A case is described in which the liquid storage reservoir 15D in which the liquid level detection device 20A is installed as illustrated in FIG. 14 is a vessel used as an oil separator. Note that the liquid storage reservoir 15D may be used as the accumulator. In such a case, the detection object is not the refrigerating machine oil O but the liquid refrigerant.

The description of a case in which the liquid storage reservoir 15D is used as an oil separator is similar to that illustrated in FIG. 11.

As illustrated in FIG. 14, the electrode 202Aa and the electrode 202Ab are disposed to face each other, and the electrode 202Aa is disposed in such a manner that the back surface of the electrode 202Aa is orthogonal to a direction in which the refrigerating machine oil O dropping from an upper portion to a lower portion of the vessel main body 150D flows. The refrigerating machine oil O separated from the refrigerant R drops from an upper portion to a lower portion of the vessel main body 150D by gravity. In an installation example illustrated in FIG. 14, the liquid level detection device 20A is installed in such a manner that the signal vector (the arrow A1) of a signal traveling between the electrodes 202A is parallel to a streamline vector (the arrow B) of the fluid dropping in the vessel main body 150D.

When the liquid level detection device 20A is thus installed, one of the electrodes 202A can prevent liquid droplets of the fluid dropping in the vessel main body 150D from being in contact with the heat generating element 201A. That is, the one of the electrodes 202A also serves as a shielding portion. Consequently, in the vessel main body 150D, the fluid dropping toward the liquid level detection device 20A collides with the one of the electrodes 202A, the flow of the fluid is interrupted, and thus the fluid does not reach the heat generating element 201A.

As described above, when the liquid level detection device 20A is installed as illustrated in FIG. 14, the liquid droplets are not in contact with the heat generating element 201A. Thus, the liquid level detection device 20A does not erroneously determine a gaseous part as a liquid part, that is, does not make false detection.

Note that a case in which the liquid level detection device 20A is installed in the liquid storage reservoir 15 has been described as an example, but the same applies to the case in which each of the liquid level detection device 20B to the liquid level detection device 20D is installed.

As described above, the liquid level detection device 20 includes the first plate (the electrode 202Aa, the electrode 202Ba, the transmitter 203, and the optical transmitter 205), and the second plate (the electrode 202Ab, the electrode 202Bb, the receiver 204 (or the reflector), and the optical receiver 206 (or the reflector)) disposed to face the first plate. As the first plate is disposed in such a manner that the back surface of the first plate is orthogonal to a direction in which the fluid around the first plate flows in the liquid storage reservoir 15, the first plate can serve as a shielding portion, and thus the liquid level detection device 20 is not influenced by the liquid droplets even when the liquid droplets are scattered in the gaseous part. Erroneous determination can be therefore reduced.

Embodiment 2

Figure 15:
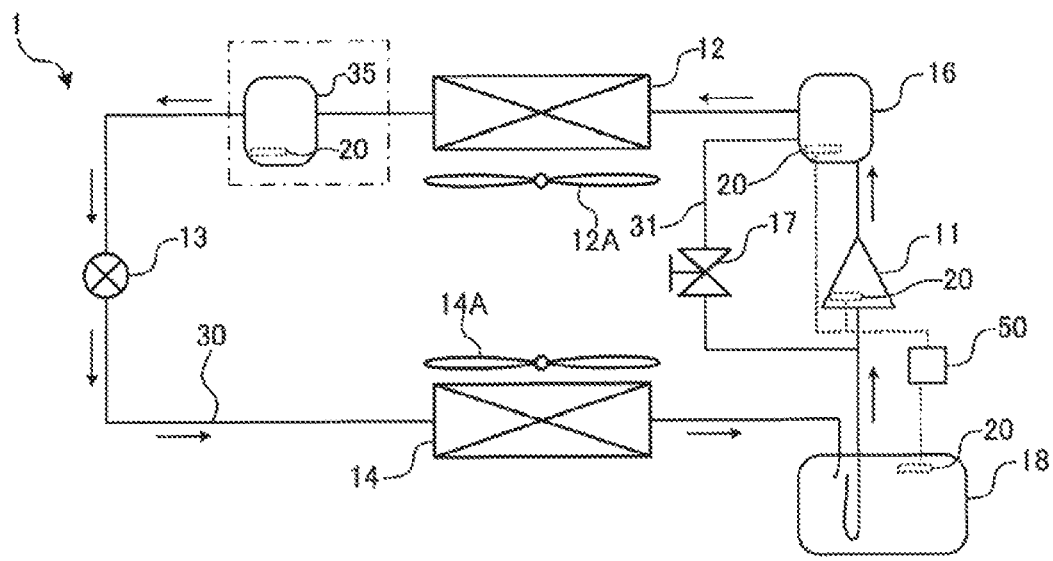
FIG. 15 is a schematic configuration diagram illustrating an example of a refrigerant circuit configuration of a refrigeration cycle apparatus according to Embodiment 2 of the present invention.

FIG. 15 is a schematic configuration diagram illustrating an example of a refrigerant circuit configuration of a refrigeration cycle apparatus (hereinafter, referred to as a refrigeration cycle apparatus 1) according to Embodiment 2 of the present invention. With reference to FIG. 15, the refrigerant circuit configuration and the operation of the refrigeration cycle apparatus 1 will be described. In Embodiment 2, the description is provided focusing on the difference from Embodiment 1, and the same elements as those of Embodiment 1 are denoted by the same reference signs and the description of the elements is omitted.

The refrigeration cycle apparatus 1 performs a vapor compression-type refrigeration cycle operation, and includes the liquid level detection device 20 according to Embodiment 1 that is included in a component (for example, at least one of a compressor 11, an oil separator 16, an accumulator 18, and a receiver 35) in which the fluid is stored.

<Configuration of Refrigeration Cycle Apparatus 1>

The refrigeration cycle apparatus 1 includes the compressor 11, a condenser 12, an expansion device 13, an evaporator 14, the accumulator 18, the oil separator 16, at least one of the liquid level detection devices 20, and the controller 50.

The refrigeration cycle apparatus 1 includes a refrigerant circuit that is formed by connecting the compressor 11, the condenser 12, the expansion device 13, and the evaporator 14 through a refrigerant pipe 30.

The oil separator 16 is provided to a refrigerant discharge portion of the compressor 11, and the accumulator 18 is provided to a refrigerant suction portion of the compressor 11.

Note that provision of the receiver 35 is optional, but when the receiver 35 is installed in the refrigeration cycle apparatus 1, the receiver 35 is typically installed on a high-pressure portion between the condenser 12 and the expansion device 13 as illustrated in FIG. 15.

(Compressor 11)

The compressor 11 is used to deliver the refrigerant. Specifically, the compressor 11 has a function of compressing gas refrigerant into a high temperature and a high pressure and discharging the compressed gas refrigerant. The compressor 11 has a refrigerant suction portion connected to the accumulator 18, and a refrigerant discharge portion connected to the condenser 12. Note that as illustrated in FIG. 15, the condenser 12 is connected to the refrigerant discharge portion of the compressor 11 through the oil separator 16. In addition, the compressor 11 can be made up of, for example, an inverter compressor. As the compressor 11, a rotary compressor, a scroll compressor, a screw compressor, a reciprocating compressor, or another type compressor is applicable, for example.

(Oil Separator 16)

The oil separator 16 is configured to separate the refrigerating machine oil discharged from the compressor 11 together with the refrigerant, and return the separated refrigerating machine oil to the suction portion of the compressor 11 through a bypass valve 17. Specifically, the oil separator 16 is a device that separates the refrigerating machine oil from the discharge gas discharged from the compressor 11, and returns only the refrigerating machine oil to the suction portion of the compressor 11.

A lower portion of the oil separator 16 is connected to the suction portion of the compressor 11 by the bypass pipe 31. The bypass valve 17 is installed in the bypass pipe 31.

The bypass valve 17 opens and closes the bypass pipe 31 to interrupt and permit the flow of the refrigerant. The bypass valve 17 can be made up of, for example, a solenoid valve that can open and close the bypass pipe 31.

(Condenser 12)

The condenser 12 (a radiator) is configured to condense the refrigerant discharged from the compressor 11 into high-pressure liquid refrigerant. The condenser 12 has an upstream portion connected to the compressor 11 and a downstream portion connected to the expansion device 13. The condenser 12 can be made up of, for example, a fin-and-tube type heat exchanger. The condenser 12 is provided with a fan 12A that supplies air serving as a heat exchange medium to the condenser 12.

(Expansion Device 13)

The expansion device 13 is configured to expand refrigerant through the condenser 12 and reduce the pressure of the refrigerant. The expansion device 13 is preferably made up of, for example, an electrically driven expansion valve that can adjust its opening degree and adjust the flow rate of the refrigerant. Note that as the expansion device 13, not only the electrically driven expansion valve but also a mechanical expansion valve using a diaphragm for a pressure reception portion, or a capillary tube is applicable. The expansion device 13 has an upstream portion connected to the condenser 12 and a downstream portion connected to the evaporator 14.

(Evaporator 14)

The evaporator 14 is configured to evaporate the refrigerant reduced in pressure by the expansion device 13 into the gas refrigerant. The evaporator 14 has an upstream portion connected to the expansion device 13 and a downstream portion connected to the accumulator 18. The evaporator 14 can be made up of, for example, a fin-and-tube type heat exchanger. The evaporator 14 is provided with a fan 14A that supplies air serving as a heat exchange medium to the evaporator 14.

(Accumulator 18)

The accumulator 18 has a function of storing the liquid refrigerant or other similar material. The accumulator 18 has an upstream portion connected to the evaporator 14 and a downstream portion connected to the suction portion of the compressor 11.

(Receiver 35)

Similar to the accumulator, the receiver 35 has a function of storing the liquid refrigerant or other similar material. The receiver 35 has an upstream portion connected to the condenser 12 and a downstream portion connected to the expansion device 13.

(Liquid Level Detection Device 20)

The liquid level detection device 20 is configured to detect the liquid level position of the liquid refrigerant stored in the liquid storage reservoir 15 and the oil level position of the refrigerating machine oil stored in the vessel. The liquid level detection device 20 is installed in, for example, at least one of the accumulator 18, the compressor 11, and the oil separator 16. That is, the accumulator 18, the compressor 11, and the oil separator 16 have a function as the liquid storage reservoir 15 described in Embodiment 1. FIG. 15 illustrates an example in which the liquid level detection device 20 is installed in each of the accumulator 18, the compressor 11, and the oil separator 16, but it is only required that the liquid level detection device 20 is installed in at least one of the accumulator 18, the compressor 11, and the oil separator 16.

(Controller 50)

The controller 50 is configured to calculate the amount of the liquid refrigerant stored in the vessel in which the liquid level detection device 20 is installed on the basis of a result of detection by the liquid level detection device 20. Specifically, the controller 50 includes a power supply circuit unit configured to supply a voltage (power) to the liquid level detection device 20, a computation circuit unit configured to compute a temperature of the heat generating element 201A of the liquid level detection device 20, and a memory unit configured to store, for example, a given table showing a relationship between a resistance value and the temperature of the heat generating element 201A.

For example, when the liquid level detection device 20 is the heating type PTC sensor, the resistance value of the heat generating element 201A increases as the temperature of the heat generating element 201A increases. When the heat generating element 201A is in contact with the liquid refrigerant, the temperature of the heat generating element 201A decreases to be lower than a temperature when the heat generating element 201A is in contact with the gas refrigerant. Consequently, the resistance value of the heat generating element 201A decreases correspondingly. On the other hand, when the heat generating element 201A is in contact with the gas refrigerant and a speed of the gas refrigerant is not extremely high, the resistance value is higher than that when the heat generating element 201A is in contact with the liquid refrigerant.

As described above, the resistance value of the heat generating element 201A differs depending on whether the heat generating element 201A of the liquid level detection device 20 is in contact with the liquid refrigerant or the gas refrigerant. Then, the controller 50 detects a liquid level on the basis of such information transmitted from the liquid level detection device 20.

For example, the controller 50 computes each of the resistance values of the heat generating elements 201A from factors such as values of voltage and current supplied to a corresponding one of the heat generating elements 201A. The controller 50 computes each of the temperatures from the resistance value of a corresponding one of the heat generating elements 201A by using the given table. Then, the controller 50 determines where a height position of a liquid level in the liquid storage reservoir 15A is located on the basis of the temperatures of the heat generating elements 201A.

The controller 50 can determine whether the liquid refrigerant in the accumulator 18 overflows on the basis of the result of detection by the liquid level detection device 20. In addition, the controller 50 can determine whether the refrigerant filling the refrigerant circuit of the refrigeration cycle apparatus 1 leaks. Furthermore, the controller 50 can calculate the amount of the filling refrigerant when the refrigeration cycle apparatus 1 is filled with the refrigerant after installation of the refrigeration cycle apparatus 1.

Each actuator (drive components) is connected to the controller 50, and the controller 50 controls the operation of each actuator. Examples of the actuator include the compressor 11, the expansion device 13, the bypass valve 17, the fan 12A, and the fan 14A.

The controller 50 has not only a function of calculating the amount of the liquid refrigerant but also a function of controlling the operation of each actuator on the basis of the detection values from other various sensors (not illustrated). The controller 50 may be constructed by hardware such as a circuit device for implementing functions of the controller 50 or a computing device such as a microcomputer and a CPU and software to be executed by the computing device.

(Others)

When the refrigeration cycle apparatus 1 is used as, for example, an air-conditioning apparatus, the fan 12A is mounted to an outdoor unit together with the condenser 12, whereas the fan 14A is mounted to an indoor unit together with the evaporator 14. The fan 12A is used to supply air to the condenser 12 to promote heat exchange between the refrigerant flowing through the condenser 12 and the air. The fan 14A is used to supply air to the evaporator 14 to promote heat exchange between the refrigerant flowing through the evaporator 14 and the air.

When the condenser 12 is configured to exchange heat between the refrigerant and material such as water and brine, a pump for delivering the material such as water and brine to the condenser 12 is installed instead of the fan 12A.

Similarly, when the evaporator 14 is configured to exchange heat between the refrigerant and material such as water and brine, a pump for delivering the material such as water and brine to the evaporator 14 is installed instead of the fan 14A.

Note that the refrigeration cycle apparatus 1 is used as a hot-water supply device, a combined air-conditioning and hot-water supply device, and a refrigeration device, in addition to the air-conditioning apparatus.

Furthermore, when the receiver 35 is provided, the receiver 35 is provided downstream of the condenser 12 as illustrated in FIG. 15. When the receiver 35 is provided, the liquid level detection device 20 is also preferably installed in the receiver 35. The receiver 35 also has a function as the liquid storage reservoir 15 described in Embodiment 1. Note that the receiver 35 may be provided together with the accumulator 18, or one of the receiver 35 and the accumulator 18 may be provided.

<Position at Which Liquid Level Detection Device 20 is Installed in Compressor 11>

Figure 16:
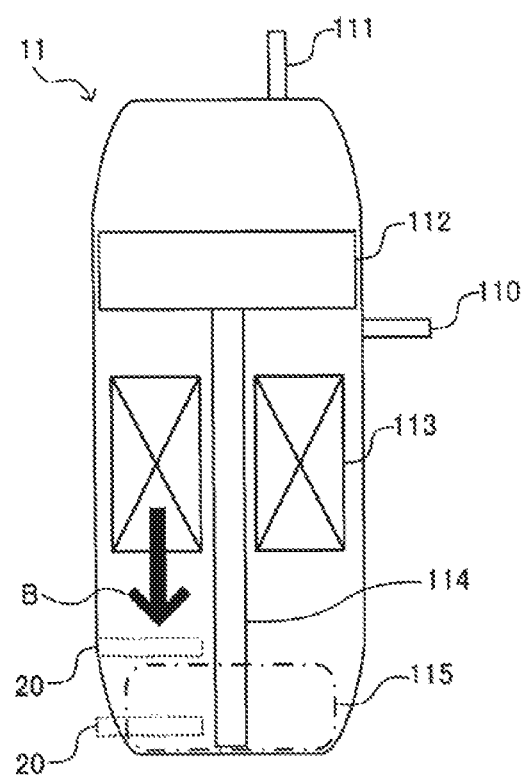
FIG. 16 is a schematic configuration diagram schematically illustrating a configuration of a compressor that is one component of the refrigeration cycle apparatus according to Embodiment 2 of the present invention.

FIG. 16 is a schematic configuration diagram schematically illustrating a configuration of the compressor 11 that is one component of the refrigeration cycle apparatus 1. With reference to FIG. 16, a position at which the liquid level detection device 20 is installed in the compressor 11 will be described. Note that the liquid level detection by the liquid level detection device 20 is the same as that described in Embodiment 1.

The compressor 11 includes a suction unit 110, a discharge unit 111, a compression unit 112, the motor unit 113, a shaft and oil pump unit 114, and an oil sump 115. Note that the suction unit 110 corresponds to the inlet pipe 151 described in Embodiment 1, and the discharge unit 111 corresponds to the outlet pipe 152 described in Embodiment 1.

The gas refrigerant is suctioned in the compressor 11 from the suction unit 110. The gas refrigerant suctioned in the compressor 11 is compressed by the compression unit 112 using the rotational force of the motor unit 113. The high-temperature high-pressure gas refrigerant that is compressed by the compression unit 112 is discharged from the discharge unit 111. When the gas refrigerant is compressed, the refrigerating machine oil stored in the oil sump 115 is supplied to the compression unit 112 through the shaft and oil pump unit 114 to reduce the friction of the sliding portion of the compression unit 112.

When the amount of the refrigerating machine oil is excessively large, the motor unit 113 is filled with the refrigerating machine oil, and thereby the rotation efficiency is reduced. On the other hand, when the amount of the refrigerating machine oil is excessively small, the refrigerating machine oil cannot be supplied to the compression unit 112, and the friction becomes large, which may cause a failure of the compression unit 112. Consequently, it is desirable to control the amount of the refrigerating machine oil for a proper amount. Then, in the refrigeration cycle apparatus 1, the liquid level detection device 20 is installed in the oil sump 115 of the compressor 11 to obtain information on the amount of the refrigerating machine oil. For example, the two liquid level detection devices 20 are each preferably installed at a corresponding one of the lower limit position and the upper limit position of the oil sump 115 as illustrated in FIG. 16.

<Position at which Liquid Level Detection Device 20 is Installed in Oil Separator 16>

When the refrigerating machine oil separated by the oil separator 16 is controlled to be constantly returned to the suction portion of the compressor 11, the operation efficiency of the refrigeration cycle apparatus is reduced. Consequently, the liquid level detection device 20 is preferably installed at the lower portion of the oil separator 16 as illustrated in FIG. 15, and in addition the bypass valve 17 is preferably controlled to be opened after the liquid level detection device 20 detects that the refrigerating machine oil has been stored in the oil separator 16 on the basis of the information from the liquid level detection device 20.

<Position at which Liquid Level Detection Device 20 is Installed in Accumulator 18>

As described in Embodiment 1, to operate the refrigeration cycle apparatus 1 efficiently, it is important to obtain information on the amount of the refrigerant circulating through the refrigerant cycle. Then, the liquid level detection device 20 is installed in the accumulator 18, and detects a liquid level of the liquid refrigerant stored in the accumulator 18 to obtain information on the amount of the refrigerant.

A position at which the liquid level detection device 20 is installed in the accumulator 18 is not limited to a particular position, but for example, the two liquid level detection devices 20 are each preferably installed at a corresponding one of the lower limit position and the upper limit position of the accumulator 18. When the liquid level is to be detected in more detail, three or more of liquid level detection devices 20 are preferably installed in the vertical direction. Instead of providing a plurality of liquid level detection devices 20, the first plate and the second plate included in the liquid level detection device 20 may extend in the vertical direction to detect a plurality of liquid levels.

<Operation of Refrigeration Cycle Apparatus 1>

Next, the operation of the refrigeration cycle apparatus 1 will be described together with the flow of the refrigerant. A cooling operation will be described. Note that in FIG. 15, the flow of the refrigerant is represented by solid lines. The operation of the refrigeration cycle apparatus 1 when the heat-exchanging fluid is air and the heat-exchanged fluid is refrigerant will be described as an example.

When the compressor 11 is driven, the high-temperature high-pressure gas refrigerant is discharged from the compressor 11. The high-temperature high-pressure gas refrigerant (single phase) that is discharged from the compressor 11 flows into the condenser 12 through the oil separator 16. In the condenser 12, heat is exchanged between the high-temperature high-pressure gas refrigerant that has flowed into the condenser 12 and the air supplied by the fan 12A, so that the high-temperature high-pressure gas refrigerant is condensed into liquid refrigerant (single phase) with high pressure.

The high-pressure liquid refrigerant that has been delivered from the condenser 12 is expanded by the expansion device 13 into two-phase refrigerant with a low pressure including the gas refrigerant and the liquid refrigerant. The two-phase refrigerant flows into the evaporator 14. In the evaporator 14, heat is exchanged between the two-phase refrigerant having flowed into the evaporator 14 and the air supplied by the fan 14A, so that the liquid refrigerant in the two-phase refrigerant is evaporated to cause the two-phase refrigerant to turn into gas refrigerant (single phase) with a low pressure. The low-pressure gas refrigerant that has been delivered from the evaporator 14 flows into the compressor 11 through the accumulator 18, and is compressed into gas refrigerant with a high temperature and a high pressure, and the high-temperature high-pressure gas refrigerant is discharged from the compressor 11 again. Subsequently, this cycle is repeated.

In Embodiment 2, a case in which the heating type liquid level detection sensor (the liquid level detection device 20A according to Embodiment 1) is used as the liquid level detection device 20 has been described as an example, but the same liquid level detection can be performed using the capacitance type liquid level detection sensor (the liquid level detection device 20B according to Embodiment 1), the ultrasonic vibration type liquid level detection sensor (the liquid level detection device 20C according to Embodiment 1), or the optical liquid level detection sensor (the liquid level detection device 20D according to Embodiment 1). Each of these liquid level detection devices can measure a value at the sensor portion (the first plate and the second plate), the value differing depending on whether the sensor portion is in contact with the liquid refrigerant or the gas refrigerant, and thereby the liquid level detection device can perform gas-liquid determination on the basis of the measured value.

Although a case in which the controller 50 computes the temperature from the resistance value has been described in Embodiment 2, the controller 50 is not limited to this description. For example, when the liquid level detection device 20 is the PTC sensor, the resistance value and the temperature have a proportional relationship. Consequently, the controller 50 may be configured to compare values of the resistance values of the heat generating element 201A without converting the resistance values into the temperatures.

Furthermore, although the mode in which the heat generating element 201A has both of the function as the element configured to generate heat and the function as the element having a changing resistance has been described in Embodiment 2, the heat generating element 201A is not limited to this description, and each of different configurations may be provided with the two functions. For example, the liquid level detection device 20A may be configured in such a manner that a heating body and a temperature sensor that is independent of the heating body and is placed along with the heating body are provided to a sheath in place of the heat generating element 201A. Here, for example, a thermistor can be used as the temperature sensor. Furthermore, for example, a resistor can be used as the heating body. Then, the resistor can heat itself by being energized.

<Effects of Refrigeration Cycle Apparatus 1>

As the refrigeration cycle apparatus 1 includes the liquid level detection device 20 according to Embodiment 1, the first plate serves as a shielding plate, the fluid is not in direct contact with the heat generating element 201A, and a decrease in detection accuracy of the liquid level can be therefore reduced. Note that in the liquid level detection device 20 having no heat generating element 201A, the first plate also serves as a shielding plate, the fluid does not flow in between the first plate and the second plate, and the decrease in detected accuracy of the liquid level can be therefore reduced.

A configuration in which a sensor portion (a pair of the first plate and the second plate) is provided in the liquid level detection device 20 as a single component has been described as an example, but the configuration is not limited to this description. For example, a plurality of sensor portions may be provided.

The liquid level detection device 20 can be also used as a sensor in an overflow detection technology for detecting overflow of the liquid refrigerant from the accumulator 18, and is capable of preventing backflow of the liquid refrigerant to the compressor 11. In this manner, a failure of the compressor 11 can be prevented, and the reliability of the compressor 11 can be enhanced.

The refrigeration cycle apparatus 1 can obtain information on the amount of liquid in the accumulator 18 at the time when the refrigerant circuit is filled with the refrigerant after installation of the refrigerant circuit in a building, for example. Consequently, the refrigerant circuit can be prevented from being excessively filled with the refrigerant.

Whether the refrigerant filling the refrigeration cycle apparatus 1 is leaking can be detected during an operation of the refrigeration cycle apparatus 1. Consequently, the refrigerant leakage can be early detected and the leakage problem can be early addressed accordingly, thereby global warming can be prevented. In addition, leakage of refrigerant such as flammable refrigerant can be detected early, thereby, for example, occurrence of a serious accident such as combustion and explosion can be prevented.

When the liquid level detection device 20 makes false detection, the disadvantages described below are caused, the refrigeration cycle apparatus 1 is not operated normally, and further a failure of an apparatus may be caused.

For example, when the liquid level detection device 20 installed in the accumulator 18 erroneously detects the gaseous part as a liquid part, the degree of superheat at the outlet of the evaporator 14 is set to a higher value, and the refrigerant in a superheated gas state is thus caused to flow into the accumulator 18 to store the liquid refrigerant stored in the accumulator 18 in the condenser 12 of the high-pressure portion. The liquid refrigerant more than necessary is collected in the condenser 12 due to false detection, abnormal high-pressure increases are caused, and thus the normal operation becomes impossible.

When the liquid level detection device 20 that detects the oil level of the refrigerating machine oil in the compressor 11 erroneously detects the gaseous part as a liquid part, the amount of the refrigerating machine oil in the compressor 11 is controlled in such a manner that the amount of the refrigerating machine oil is reduced even though the amount of the refrigerating machine oil in the compressor 11 is small. Consequently, the refrigerating machine oil required to lubricate the compressor 11 cannot be secured, and thus the sliding portion of the compressor 11 seizes up and the failure of the compressor is caused.

Note that as described above, the receiver 35 may be installed to the high-pressure portion of the refrigerant circuit of the refrigeration cycle apparatus 1, and the liquid level detection device 20 may be installed to the receiver 35.

When a plurality of liquid level detection devices 20 are provided, all of the liquid level detection devices 20 may be the same type, all difficult types of liquid level detection devices 20 may be used, or some of the liquid level detection devices 20 may be the same type. Specifically, when the lower liquid level of the liquid refrigerant stored in the accumulator 18 is to be detected, the liquid level detection device 20D according to Embodiment 1 may be used. When the upper liquid level of the liquid refrigerant is to be detected, the liquid level detection device 20B according to Embodiment 1 may be used.

By transmitting the results of the liquid level detection, for example, to a management center, remote refrigerant leakage detection can be performed at all time. Consequently, even a sudden refrigerant leakage problem can be quickly addressed before an abnormality, such as damage to a device and capacity degradation, occurs, and progress of the refrigerant leakage can be slowed as much as possible. The reliability of the refrigeration cycle apparatus 1 is accordingly improved, and the degradation in the environmental state caused by outflow of refrigerant can be prevented as much as possible.

Furthermore, as an inconvenience in that an excessive operation continues with a small amount of refrigerant due to refrigerant leakage can be avoided, an increase in the life span of the refrigeration cycle apparatus 1 can be achieved.

The invention claimed is:

1. A refrigeration cycle apparatus, comprising:
    a refrigerant circuit having a compressor, a condenser, an expansion device, an evaporator, and an accumulator that are connected by a pipe, the accumulator including a vertical cylindrical vessel; and
    a liquid level detection device that is provided in the vessel of the accumulator and that is configured to detect a liquid level of liquid refrigerant stored in the vessel,
    wherein the liquid level detection device comprises:
    a first plate formed in a plate shape; and
    a second plate formed in a plate shape and disposed to face the first plate, wherein the vessel includes:
    a vessel main body;
    an inlet pipe connected to an upper surface portion of the vessel main body and allowing refrigerant to flow in through the inlet pipe; and
    an outlet pipe connected to the upper surface portion of the vessel main body and allowing the refrigerant that is present inside the vessel main body to flow out through the outlet pipe,
    wherein the inlet pipe is configured such that the refrigerant including liquid droplets having flowed into the vessel main body from the inlet pipe flows while swirling along a wall surface of the vessel main body, and
    wherein the first plate is disposed in such a manner that a surface opposite to a surface facing the second plate is orthogonal to a flow direction of the refrigerant including liquid droplets around the first plate flowing through the inlet pipe in the vessel while swirling along a wall surface of the vessel main body.

2. The refrigeration cycle apparatus of claim 1,
    wherein the first plate is disposed in such a manner that a signal travels between the first plate and the second plate in a direction parallel to the flow direction of the refrigerant around the first plate in the vessel.

3. The refrigeration cycle apparatus of claim 1,
    wherein each of the first plate and the second plate comprises an electrode,
    wherein a heat generating element having an electrical resistance that varies depending on a temperature is provided between the first plate and the second plate, and
    wherein the liquid level detection device is configured to measure the temperature and a resistance value of the heat generating element.

4. The refrigeration cycle apparatus of claim 3,
    wherein when the first plate is viewed from one surface of the first plate, an entire surface of the heat generating element is covered by the first plate.

5. The refrigeration cycle apparatus of claim 1,
    wherein each of the first plate and the second plate comprises an electrode, and
    wherein the liquid level detection device is configured to measure a capacitance between the first plate and the second plate.

6. The refrigeration cycle apparatus of claim 1,
    wherein the first plate comprises a transmitter,
    wherein the second plate comprises a receiver,
    wherein the first plate is configured to transmit one of an ultrasonic wave, a vibration, and a pulse,
    wherein the second plate is configured to receive the one of the ultrasonic wave, the vibration, and the pulse, and
    wherein the liquid level detection device is configured to measure a response when the second plate receives the one of the ultrasonic wave, the vibration, and the pulse.

7. The refrigeration cycle apparatus of claim 1,
    wherein the first plate comprises a transducer,
    wherein the second plate comprises a reflector,
    wherein the first plate is configured to transmit one of an ultrasonic wave, a vibration, and a pulse and receive the one of the ultrasonic wave, the vibration, and the pulse reflected by the second plate, and
    wherein the liquid level detection device is configured to measure a response when the first plate receives the one of the ultrasonic wave, the vibration, and the pulse.

8. The refrigeration cycle apparatus of claim 1,
wherein the first plate comprises an optical transmitter,
wherein the second plate comprises an optical receiver,
wherein the first plate is configured to emit light,
wherein the second plate is configured to receive the light, and
wherein the liquid level detection device is configured to measure a response when the second plate receives the light.

9. The refrigeration cycle apparatus of claim 1,
wherein the first plate comprises an optical transceiver,
wherein the second plate comprises a reflector, and
wherein the first plate is configured to emit light and receive the light reflected by the second plate, and
wherein the liquid level detection device is configured to measure a response when the first plate receives the light.

\* \* \* \* \*